United States Patent
Suzuki et al.

(10) Patent No.: US 7,986,371 B2
(45) Date of Patent: Jul. 26, 2011

(54) VIDEO SIGNAL PROCESSING DEVICE, METHOD OF THE SAME AND VEHICLE-MOUNTED CAMERA SYSTEM

(75) Inventors: Masayasu Suzuki, Kawasaki (JP); Takeshi Akatsuka, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1557 days.

(21) Appl. No.: 11/313,641

(22) Filed: Dec. 22, 2005

(65) Prior Publication Data
US 2006/0139488 A1    Jun. 29, 2006

(30) Foreign Application Priority Data
Dec. 24, 2004    (JP) .................................. 2004-373195

(51) Int. Cl.
*H04N 7/18* (2006.01)
*H04N 5/05* (2006.01)
*H04N 5/45* (2011.01)
*H04N 9/455* (2006.01)

(52) U.S. Cl. .................... 348/523; 348/148; 348/159

(58) Field of Classification Search ................. 348/148, 348/159, 211.5, 211.11, 513, 518, 523, 588, 348/699–701; 710/118, 125; 386/66, 84, 386/117, 119
See application file for complete search history.

(56) References Cited

U.S. PATENT DOCUMENTS

| | | | |
|---|---|---|---|
| 5,801,788 A * | 9/1998 | Ashida et al. | 348/588 |
| 6,456,335 B1 * | 9/2002 | Miura et al. | 348/588 |
| 6,476,855 B1 * | 11/2002 | Yamamoto | 348/148 |
| 7,443,447 B2 * | 10/2008 | Shirakawa | 348/376 |
| 7,477,307 B2 * | 1/2009 | Suzuki et al. | 348/317 |
| 2005/0078185 A1 * | 4/2005 | Suzuki et al. | 348/148 |
| 2006/0238826 A1 * | 10/2006 | Itou et al. | 358/448 |
| 2006/0256122 A1 * | 11/2006 | Rai et al. | 345/547 |

FOREIGN PATENT DOCUMENTS

JP    11-317908 A    11/1999

\* cited by examiner

*Primary Examiner* — Sinh Tran
*Assistant Examiner* — Daniel M Pasiewicz
(74) *Attorney, Agent, or Firm* — Foley & Lardner LLP

(57) ABSTRACT

A video signal processing device, which includes: a plurality of imaging devices outputting mutually asynchronous interlace video signals; input buffers temporarily storing field by field the video signals outputted from the respective imaging devices; and an output image generating device generating field by field video signals of output target images from the video signals stored in the input buffers, wherein each of the video signals of the output target images is generated when all of the latest video signals to be components thereof are stored in the input buffers.

15 Claims, 15 Drawing Sheets

VIDEO SIGNAL PROCESSING DEVICE, METHOD OF THE SAME AND VEHICLE-MOUNTED CAMERA SYSTEM

BACKGROUND OF THE INVENTION

1. Field of the Invention

The present invention relates to a video signal processing device for synthesizing a plurality of interlace video signals which are asynchronous to each other and generating output video signals, and a method of the same, and relates to a vehicle-mounted camera system applying the video signal processing device, which is a system mounted on a vehicle and the like, for imaging areas around the vehicle in different directions with a plurality of cameras and displaying the images for the driver thereof.

2. Description of Related Art

A vehicle-mounted camera system for image display is a driving support system for presenting a driver with an additional visual information in cases where a vehicle is moving backward and forward, such as when parking a vehicle in a garage and when pulling over to the kerb, or where a vehicle is moving into an intersection or a T intersection with poor visibility. In this system, images of the area to the rear, the area to the left front, and the area to the right front of the vehicle are imaged by a plurality of cameras connected to a camera controller, and displayed to the driver as rear and blind corner views.

In such a vehicle-mounted camera system for image display, it is necessary to lay out the plurality of the imaged images on one screen or to join the images together by the camera controller, so as to simultaneously display, for the driver, the plurality of images of the areas around the vehicle imaged in different directions by the cameras.

As a technique for synchronizing images imaged by a plurality of cameras, Japanese Patent Application Publication Laid-open No. 1999-317908 discloses a camera system in which a camera controller of a plurality of cameras creates a synchronizing signal and transmits it to the cameras, and each camera transmits a video signal in accordance with the synchronizing signal to the camera controller. Since the video signals are transmitted from the plurality of cameras to the camera controller in accordance with the same synchronizing signals, it is prevented the occurrence of image distortion when switching. By performing conversion processing on a plurality of video signals and the like using the same method, video signals for one screen can be generated by the camera controller of the vehicle-mounted camera system for image display.

However, the above-mentioned system requires a unit for generating a synchronizing signal in the camera controller, and also requires providing a signal line for supplying the synchronizing signal to each camera. Thus, there arises a problem of the complication in configuration of a device.

There is a technique for the synchronization of video signals imaged by a plurality of cameras without using a synchronizing signal, in which video signals from each camera are temporarily stored in a buffer in a camera controller.

In this method, a camera controller for receiving video signals from a plurality of cameras is provided with three planes (storage sections) of input buffers, each of which has a memory capacity equivalent to one frame (for example, equivalent to 640×480 pixels if a video signal is for the VGA system), for each of cameras connected. The camera controller sets: any one of the three planes as an input plane for storing video signals transmitted from the camera; another plane as a waiting plane having video signals temporarily stored for synchronization; the other one as an output plane outputting video signals for performing image conversion processing. Then, the function of each plane is caused to sequentially rotate.

Since the cameras transmit video signals to the camera controller at timings in accordance with respective internal clocks therein, the start timings of frame durations of the video signals transmitted from the plurality of these cameras go out of synchronization, and the way of going out of synchronization becomes non-reproductive.

If a video signal for one frame is inputted from the camera to the input plane in each input buffer for each camera, the camera controller sets the input plane as the waiting plane. Then, at the time when video signals each for one frame are inputted into the input buffers corresponding to all cameras, the waiting planes of the input buffers corresponding to all cameras are set as the output planes.

Thereafter, the camera controller simultaneously reads out video signals stored in the output planes of each input buffer. In other words, the plurality of video signals inputted from the respective cameras are simultaneously readout. Then, the camera controller performs the image conversion processing for displaying the image on a monitor or the like. A CPU in the camera controller reads out the video signals to be stored in the output planes of the input buffers frame by frame, in accordance with input buffer readout addresses stored in pattern memories. Subsequently, after performing address conversion processing, video signals for monitor display are created, which are stored in an output buffer.

Note that size of an address space provided in the pattern memory storing the addresses for the conversion processing equals the resolution of the monitor which presents a driver with an image after the address conversion (for example, VGA (640×480 pixels) size).

Hence, it is possible to absorb the a synchronization of the video signals inputted from the plurality of cameras, thus making them synchronous.

SUMMARY OF THE INVENTION

However, with the above-mentioned technique, the video signals inputted from the respective cameras are processed frame by frame, and a delay equivalent to approximately two frames (66.6 ms) at the maximum therefore occurs due to the synchronization process between each video signal. Furthermore, after storing images transmitted from all cameras in the output planes of the input buffers, the address conversion processing is performed, and eventually, an image to be displayed for the driver is generated. Accordingly, a further delay equivalent to one frame (33.3 ms) occurs. As a result, the delay equivalent to three frames (100 ms) at the maximum occurs from when the video signals are stored in the input planes of the input buffers to when the video signals are stored in the output buffer.

For example, when an object traveling at a speed of 36 km per hour relative to a vehicle having a vehicle-mounted camera system for image display, the whole delay time causes the obstacle to be displayed approximately one meter away from the actual position of the obstacle. When the vehicle-mounted camera system for image display is used in a low-speed region of parking or pulling over, some delays are acceptable. However, if the vehicle-mounted camera system for image display is used in middle to high speed regions such as when moving into an intersection or a T intersection with poor visibility, when vehicles passing each other, or when merging with other traffic, there arises a problem of an increased disparity between the actual position of an obstacle and its displayed position.

Moreover, when the disparity between the actual position of the obstacle and its displayed position increases, there is a potential to give the driver a feeling: that "the image on the monitor is halting although the vehicle is actually moving" when host vehicle starts moving; or that "the image on the monitor is moving although the vehicle is actually halting" when the host vehicle halts. In other words, there is a potential that a disagreement between the actual move of the vehicle and the move of the image on the monitor gives the driver an odd feeling or a feeling of discomfort.

Furthermore, with this method, a time difference of one frame (33.3 ms) at the maximum is caused between images displayed simultaneously, since the images imaged at each timing in accordance with the internal clock of each camera are displayed on the monitor simultaneously with the a synchronization absorbed. This time difference can be the cause that an imaged object is smeared or blurred in the vicinity of a joint, in the case where the images of the cameras are joined together side by side and displayed on one monitor. Thus, the driver may have a difficulty in recognizing the position of the object. Additionally, when the moving object around the vehicle moves over the joint of the images on the monitor, there is a potential to cause a phenomenon that the object disappears from the monitor or that the object is appeared as plural objects.

In this manner, the delay in displaying the images and the time difference between the displayed images in one monitor are important issues. These issues are not limited to the case of a vehicle-mounted camera system for image display, but include a case where images imaged by a plurality of cameras are laid out and displayed on one screen.

Moreover, with the method of buffering such input video signals to secure the synchronization, there arises a problem that the memory capacity of an input buffer increases and the size of the devices becomes larger, as the number of cameras connected to a camera controller increases.

The present invention has been made in view of such problems, and an object of the present invention is to provide a video signal processing device in a system where asynchronous images imaged by a plurality of cameras are arranged in the image of one frame, which can shorten a delay time till the image is displayed and a time difference between the images of each camera and also can reduce the memory capacity, and to provide a method of the same.

In addition, another object of the present invention is to provide a vehicle-mounted camera system which can shorten a delay time till the image is displayed and a time difference between the images of each camera and can present information on the situation surrounding the vehicle to the driver.

An aspect of the present invention is a video signal processing device, comprising: a plurality of imaging devices outputting mutually asynchronous interlace video signals; input buffers temporarily storing field by field the video signals outputted from the respective imaging devices; and an output image generating device generating field by field video signals of output target images from the video signals stored in the input buffers, wherein each of the video signals of the output target images is generated when all of the latest video signals to be components thereof are stored in the input buffers.

BRIEF DESCRIPTION OF THE DRAWINGS

The invention will now be described with reference to the accompanying drawings wherein:

FIG. 1A is a view when viewing host vehicle and other vehicles in a T intersection with poor visibility from above, and FIG. 1B is a view showing an example of an image presented to a driver with a monitor which is provided for the vehicle-mounted camera system for image display of the host vehicle in the situation shown in FIG. 1A.

FIG. 2A is a view for explaining the imaging the area to the rear of the host vehicle, and FIG. 2B is a view showing an example of an image presented to the driver with the monitor which is provided for the vehicle-mounted camera system for image display in the situation shown in FIG. 2A.

DETAILED DESCRIPTION OF THE PREFERRED EMBODIMENT

Figure 1A:
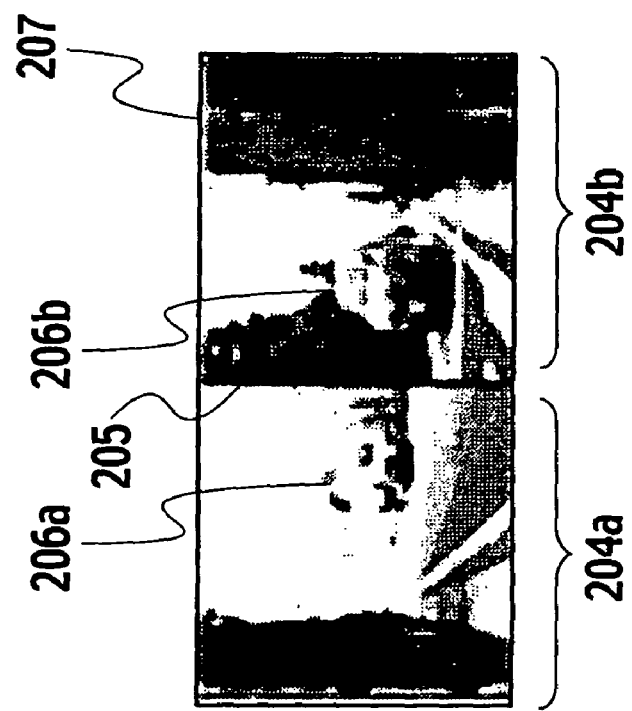
FIGS. 1A-1B are views for explaining the outline of a vehicle-mounted camera system for image display according to a first embodiment of the present invention.

Embodiment of the present invention will be explained below with reference to the drawings, wherein like members are designated by like reference characters.

First Embodiment

A description will be given of a first embodiment of the present invention with reference to FIGS. 1A to 7.

Firstly, a description will be given of the outline of a vehicle-mounted camera system for image display of this embodiment.

Figure 1B:
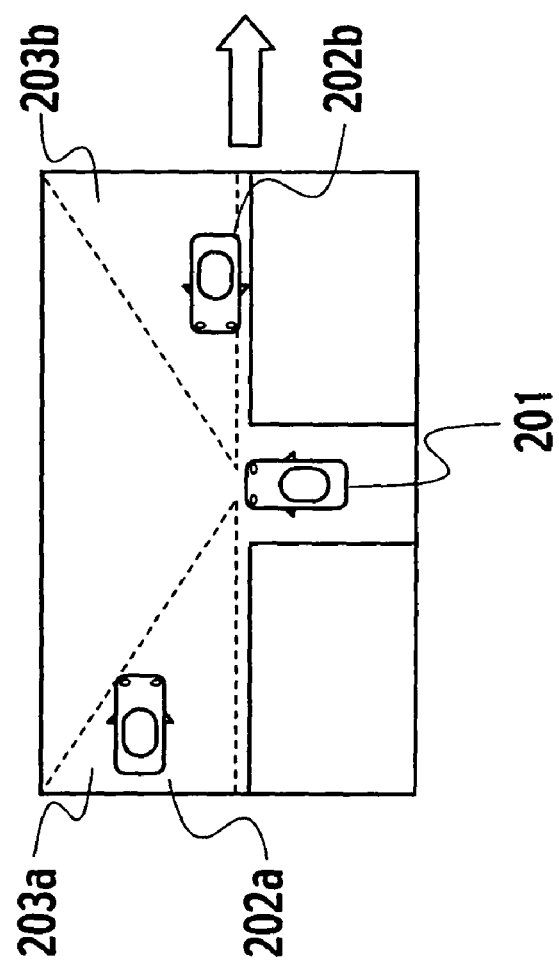

FIGS. 1A-1B explain the outline of the vehicle-mounted camera system for image display of this embodiment. FIG. 1A schematically shows a vehicle position in a T intersection with poor visibility, and FIG. 1B shows an example of an image presented to the driver by a monitor which is provided for the vehicle-mounted camera system for image display of host vehicle in the situation shown in FIG. 1A.

FIG. 1A shows a host vehicle 201, a first other vehicle 202a which comes straight from the left of the host vehicle 201, a second other vehicle 202b which comes straight from the right of the host vehicle 201, a first imaging range 203a which is imaged by a camera set up on the left front of the host vehicle 201 (hereinafter, referred to as the left camera), and a second imaging range 203b which is imaged by a camera set up on the right front of the own car 201 (hereinafter, referred to as the right camera).

Further, FIG. 1B shows the screen of a monitor 207. A left-hand image 204a of the host vehicle 201, which is imaged by the left camera, a right-hand image 204b of the host vehicle 201, which is imaged by the right camera, a dividing line image 205 (a mask line image) for dividing the left and right images on the monitor are shown on the screen of the monitor 207. The left-hand image 204a includes an image 206a of the first other vehicle 202a, and the right-hand image 204b includes an image 206b of the second other vehicle 202b.

When moving the host vehicle 201 into the T intersection with poor visibility as shown in FIG. 1A, the vehicle-mounted camera system for image display of this embodiment images the areas within the first imaging range 203a to the left front of the host vehicle 201 and within the second imaging range 203b to the right front of the host vehicle 201. Then, as shown in FIG. 1B, the obtained left- and right-hand images 204a and 204b are laid out in one screen as blind corner views, and are displayed in the monitor 207.

This enables the driver to recognize the other vehicle 202a coming straight from the left and the other vehicle 202b coming straight from the right, relative to the host vehicle 201. Thus, it is possible to urge the driver to pay attention.

Figure 2A:
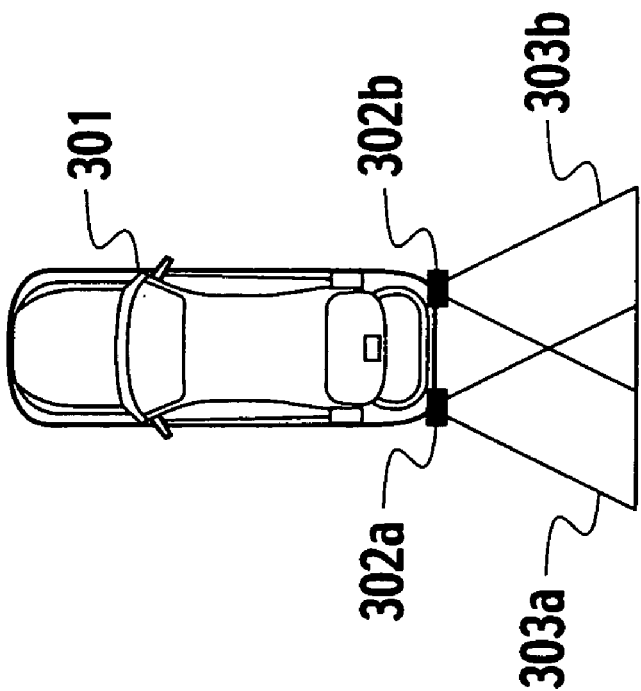
FIGS. 2A-2B are the second views for explaining the outline of the vehicle-mounted camera system for image display of the embodiment according to the present invention.
Figure 2B:
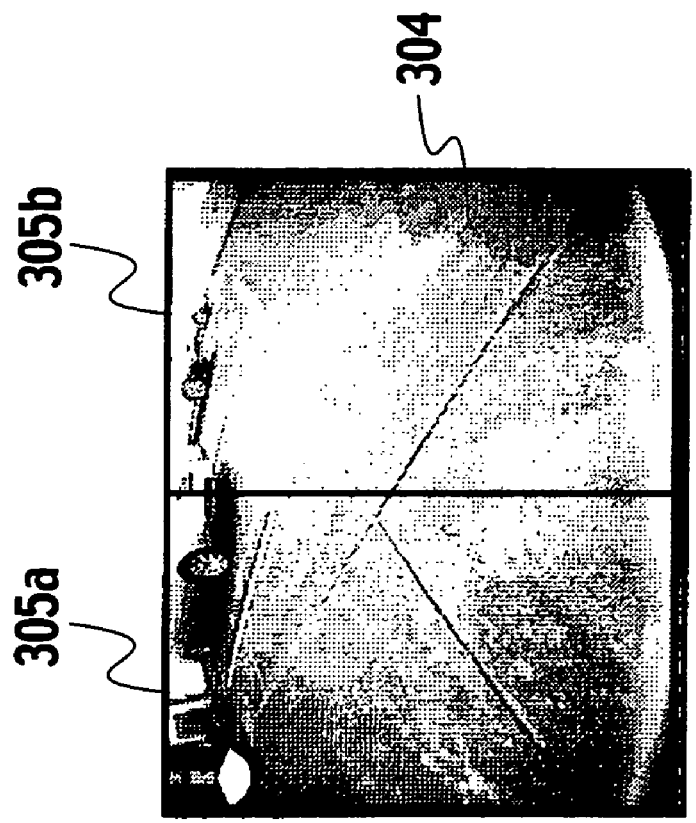

Moreover, FIGS. 2A-2B are second views for explaining the outline of the vehicle-mounted camera system for image display of this embodiment. Especially, they show an example of the images imaged by a plurality of cameras, laid out, and joined together side by side, and displayed with the continuity of the images maintained. FIG. 2A explains the imaging the area to the rear of the host vehicle. FIG. 2B shows an example of an image presented to the driver by the monitor which is provided for the vehicle-mounted camera system for image display of the host vehicle in the situation shown in FIG. 2A.

The vehicle-mounted camera system for image display images the area 303a to the left rear of a host vehicle 301 and the area 303b to the right rear of the host vehicle 301 respectively with cameras 302a and 302b. Obtained left rear image 305a and right rear image 305b are joined and laid out with the continuity of the images maintained, and displayed on a monitor 304 as rear views. Thus, it is possible to urge the driver of the host vehicle 301 to check the backward and pay attention.

In this manner, the vehicle-mounted camera system for image display can lay out a plurality of camera images on the monitor with the continuity of the images maintained.

Next, a description will be given of the configuration and operations of such a vehicle-mounted camera system for image display.

Note that, to put the description concisely, here, the description will be given of the configuration and operations while exemplifying a vehicle-mounted camera system for image display in which two cameras are connected to a camera controller, that is, there are two video signal supply sources supplying video signals to a CPU.

Furthermore, the resolution of image data imaged by a camera and the resolution of a monitor presenting to a driver are set to be the size of the video graphics array (VGA, 640 pixels high×480 pixels wide).

Figure 3:
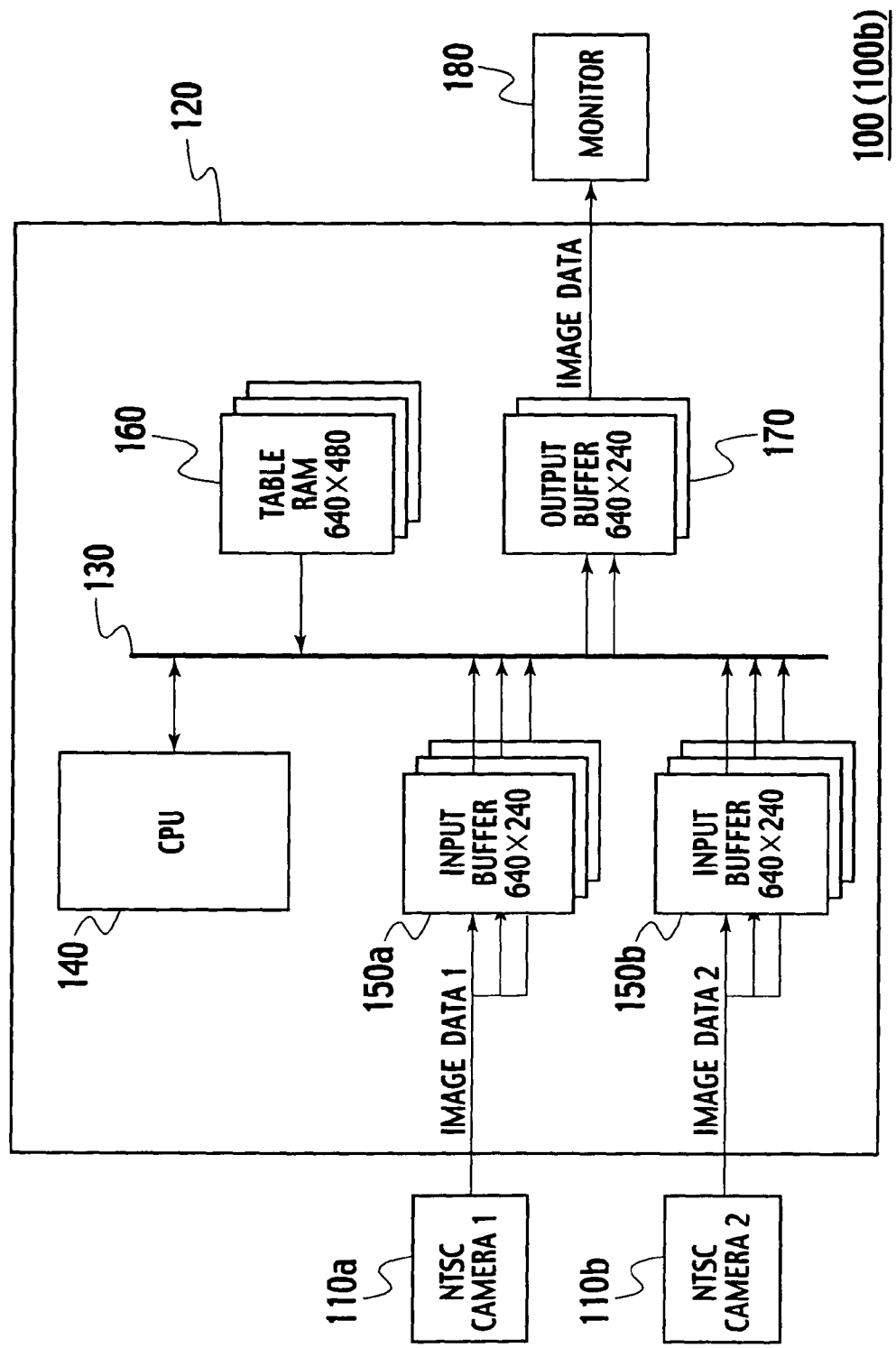
FIG. 3 is a view showing a configuration of the vehicle-mounted camera system for image display of the embodiment according to the present invention.

FIG. 3 is a view showing a configuration of a vehicle-mounted camera system for image display 100 of this embodiment. The vehicle-mounted camera system for image display 100 includes two NTSC cameras 110a and 110b, a camera controller 120 and a display monitor 180. Further, the camera controller 120 includes a data bus 130, CPU 140, input buffers 150a and 150b, a pattern memory 160, an output buffer 170 and a display monitor 180.

The NTSC cameras 110a and 110b are imaging devices each of which images the predetermined areas around a vehicle and generates image data in accordance with the NTSC system. The NTSC cameras 110a and 110b transmit image data equivalent to one frame to the camera controller 120 at intervals of 33.3 ms. Since the NTSC system employs an interlace method, the NTSC cameras 110a and 110b repeat to alternately generate the image data of the odd- and even-numbered fields at intervals of 16.7 ms and transmit it to the camera controller 120.

Each of the two NTSC cameras 110a and 110b has an internal clock, and generates the image data of each field at an independent timing according to the internal clock. Thus, the image data is outputted to the camera controller 120. Therefore, the image data generated and outputted in the NTSC camera 110a, and the image data generated and outputted in the NTSC camera 110b become asynchronous signals whose field durations (or frame durations) are deviated from each other. Moreover, this a synchronization (the way of deviating from the other and a deviating time) is non-reproductive.

Note that these NTSC cameras 110a and 110b correspond to the left and right cameras for imaging the areas to the left front and to the right front of the host vehicle 201 in FIG. 1A, or to the cameras 302a and 302b for imaging the area to the rear of the host vehicle in FIG. 2A.

The camera controller 120 performs image conversion processing on each image imaged by the NTSC cameras 110a and 110b, and cause the display monitor 180 to display the image.

The camera controller 120 has a configuration in which the data bus 130 is connected to: the CPU 140; the input buffer 150a connected to the NTSC camera 110a; the input buffer 150b connected to the NTSC camera 110b; the pattern memory 160; and the output buffer 170 connected to the display monitor 180.

The input buffers 150a and 150b are provided to the two NTSC cameras 110a and 110b, respectively, and store field by field video signals inputted from the corresponding NTSC cameras 110a and 110b.

Each of the input buffers 150a and 150b has a memory space functioning as a field memory with three planes (each plane has a memory space equivalent to one field in VGA system (640 pixels×240 pixels)). The three planes are sequentially set to be an input plane to be a storage target for storing a video signal transmitted from the camera, a waiting plane temporarily storing the video signal to have the video signal synchronized with a video signal transmitted from the other camera, and an output plane for outputting the stored video signal to start performing the image conversion processing after the synchronization with the other camera.

The CPU 140 controls address conversion processing in the camera controller 120. At this point, the CPU 140 monitors whether image data transmitted from the NTSC cameras 110a and 110b is of the odd- or even-numbered field, and then decides which image data to use for the address conversion processing. The determination of odd or even of this field image data (the determination whether to be the even- or odd-numbered field) is made by an unillustrated NTSC decoder provided for each camera in a stage prior to the input buffer 150. Note that the NTSC decoder is provided with a synchronizing separator circuit for separating vertical and horizontal synchronizing signals from the image data transmitted from the camera. Hence, it is possible to use the synchronizing signals as trigger signals of the camera controller 120 by capturing the synchronizing signals into the camera controller 120.

The output buffer 170 is a memory which temporality stores image data to be displayed on the display monitor 180, and includes: an output buffer input plane for storing image data sequentially inputted through the data bus 130 while the data is being converted; and an output buffer output plane from which the display monitor 180 reads out field by field the converted video signals. The provision of two planes for the output buffer 170 reduces flicker in the image presented to the driver.

The pattern memory 160 is a memory in which the data of address values is stored for the CPU 140 to perform the address conversion processing on the video signal stored field by field in the input buffers 150a and 150b. The pattern memory 160 stores a corresponding relationship between the memory addresses of the input buffer 150a or 150b and the memory addresses of the output buffer 170. The pattern memory 160 includes a certain number of planes corresponding to the layouts of the images on a screen presented to the driver.

In the embodiment, the pattern memory 160 stores the address corresponding relationship between the input buffer 150 and the output buffer 170 when two images are arranged and displayed side by side as shown in the monitor 207 of FIG. 1B and the monitor 304 of FIG. 2B.

Figure 4:
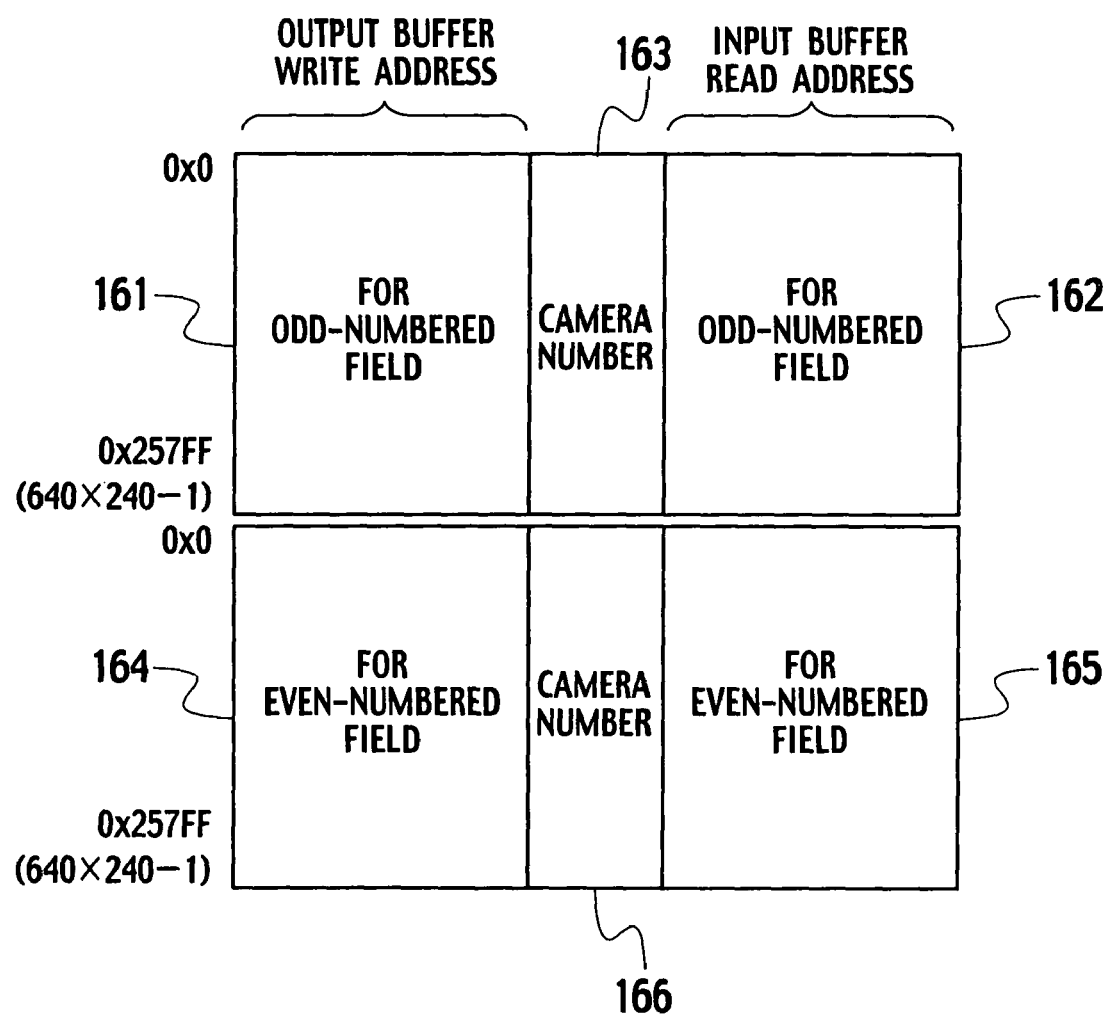
FIG. 4 is a view showing an example of a memory map of a pattern memory of a camera controller of the vehicle-mounted camera system for image display shown in FIG. 3.

FIG. 4 is a view showing an example of a memory map stored in the pattern memory 160.

In FIG. 4, the pattern memory 160 includes: an output buffer write address region for odd-numbered field 161; an input buffer read address region for odd-numbered field 162; a camera number region for odd-numbered field 163; an output buffer write address region for even-numbered field 164; an input buffer read address region for even-numbered field 165; and a camera number region for even-numbered field 166.

In order to perform field by field the read address conversion processing, under the condition of a layout presented to the driver, the present invention uses the pattern memory for the odd-numbered field when performing the read address conversion processing on the video signal of the odd-numbered field, and uses the pattern memory for the even-numbered field when performing the read address conversion processing on the video signal of the even-numbered field. Each of the pattern memories has an address space equivalent to 640×240 pixels.

Note that when each address value from 0th pixel (0×0 ("10×" means to be a hexadecimal notation)) to 640×240−1 th pixel (0×257FF) of the output buffer (that is, 0×0 to 0×257FF) is sequentially stored in the output buffer write addresses 161 and 164, it is possible to delete the output buffer write addresses 161 and 164.

The CPU 140 of the camera controller 120 determines whether field image data is odd or even, from the image data transmitted from the camera, thus switching the pattern memory regions used based on the determination result.

Figure 5:
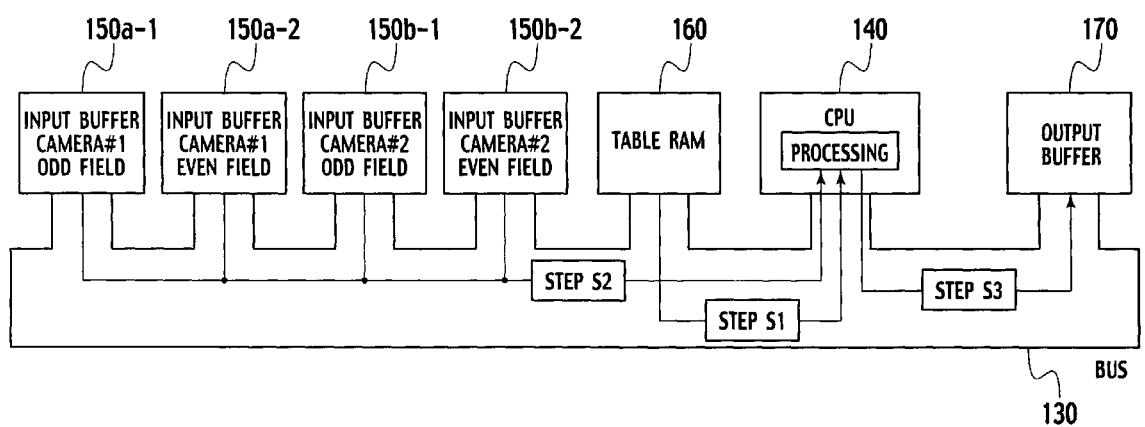
FIG. 5 is a view schematically showing a flow of data upon address conversion processing in the camera controller of the vehicle-mounted camera system for image display shown in FIG. 3.

FIG. 5 is a view schematically showing the flow of data in the address conversion process.

In FIG. 5, after the determination of odd or even of field data on the image data received from the plurality of cameras, the decision of field data targeted for the address conversion, and the synchronization in the input buffer, the CPU 140 reads out read and write addresses in accordance with the layout presented to the driver from the pattern memory 160 (Step S1).

Then, the CPU 140 reads out a pixel signal stored in the read address of the input buffer 150a or 150b (Step S2), and writes the pixel signal into the write address of the output buffer 170 (Step S3).

With the vehicle-mounted camera system for image display 100 of this embodiment, an output video signal is generated on a field-by-field basis from a plurality of video signals which are sequentially inputted from the plurality of NTSC cameras 110a and 110b, and performed thereon the processing using the pattern memory 160 as described above. The processing is referred to as the address conversion processing.

Note that although the description has been given of this address conversion processing controlled by the CPU, the processing may be performed by a dedicated signal processing circuit which is configured with LSI, FPGA, DSP and the like.

Figure 6:
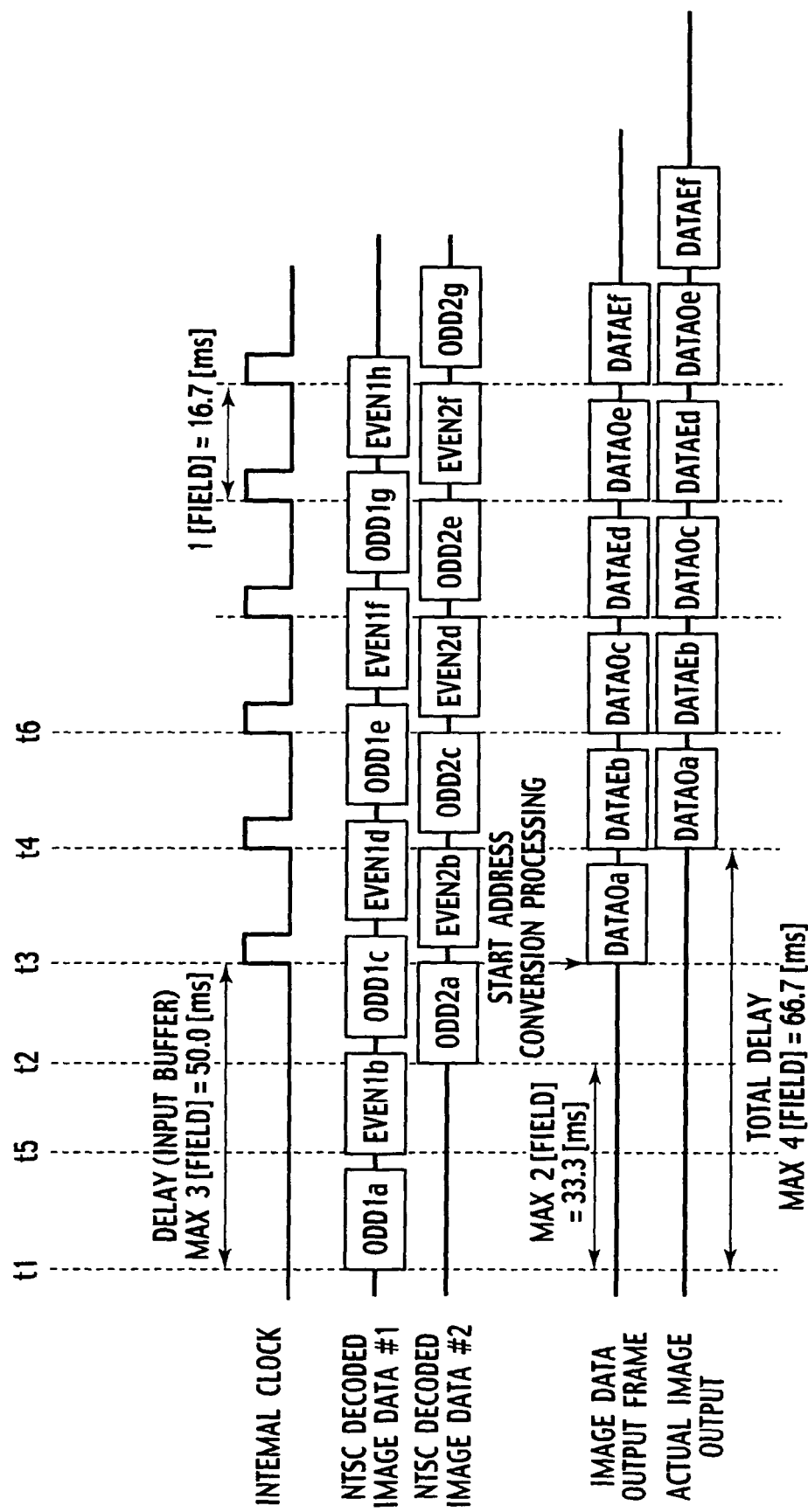
FIG. 6 is a view showing a timing chart of input and output data of a vehicle-mounted camera system for image display of a first embodiment of the present invention.

FIG. 6 shows a chart of input and output timings when the address conversion processing is performed in the above-mentioned processing on a field by field basis.

As shown in FIG. 6, from a time t1, it is assumed that: image data transmitted from a camera #1 (the first odd field data Odd1a) is started to be inputted into the input plane of the input buffer 150a; and from a time t2 delayed from the time t1, image data transmitted from a camera #2 (the first odd field data Odd2a) is started to be inputted into the input plane of the input buffer 150b. In this case, the delay of t2 from t1 is equivalent to two fields (33.3 ms) at the maximum.

When the address conversion processing is performed field by field and the output data is displayed on the monitor, the image data of the odd field data Odd1a of the camera #1 and of the odd field data Odd2a of the camera #2 is used to create DataOa which is odd field data in the output monitor. Therefore, the camera controller starts the address conversion processing at a time t3 when completing the reception of both image data, and finishes storing the converted data as the output data in the output buffer at a time t4.

Similarly, the image data of even field data Even1b of the camera #1 and of even field data Even2b of the camera #2 is used to create DataEb which is the even-numbered field data in the camera #1. Therefore, the camera controller starts the address conversion processing at the time t4 when completing the reception of both image data, and finishes storing the converted data as the output data in the output buffer at a time t6.

Accordingly, with the vehicle-mounted camera system for image display 100, the whole delay time from the time t1 when starting the input of the input data of the camera #1 to the time t4 when outputting and displaying the output data to and on the monitor or the like is approximately 66.7 ms.

Figure 7:
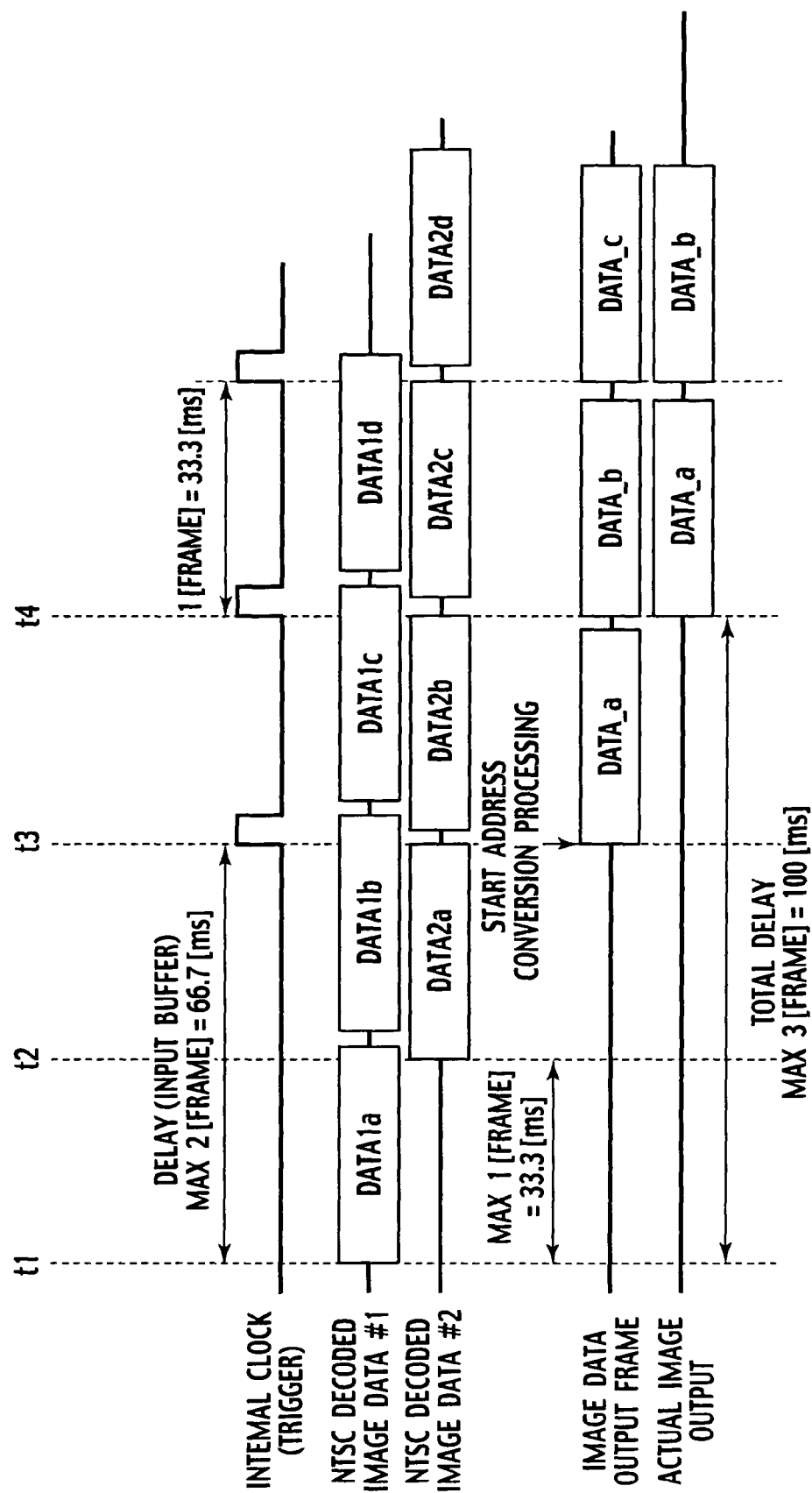
FIG. 7 is a view showing a timing chart of input and output data of a conventional vehicle-mounted camera system for image display.

FIG. 7 shows an input and output timing chart of when performing the address conversion processing frame by frame for a comparison.

In FIG. 7, timings t1 and t2 when the image data is transmitted from the two NTSC cameras (the cameras #1 and #2) are totally the same as those in FIG. 6. Note that, in FIG. 7, the inputted video signals are shown not on a field by field basis, but on a frame by frame basis.

As shown in FIG. 7, it is assumed that: from the time t1, image data (Data1a) transmitted from the camera #1 is started to be received at the input plane of the input buffer; and from the time t2 delayed from the time t1, image data (Data2a) transmitted from the camera #2 is started to be received at the input plane of the input buffer. Further, it is assumed that t3 is the time when completing storing the input data of the cameras #1 and #2, each equivalent to one frame, in the output plane of the input buffer. In this case, the delay time required for the input is approximately two frames (66.6 ms). Then, at the relevant time t3, the input data is read out each from the output planes of the input buffers and the conversion processing is started. The time when actually finishing storing the converted data in the output buffer as the output data is the time t4. Hence, the whole delay time from the time t1 when starting the input of the input data of the camera #1 to the time t4 when outputting and displaying the output data to and on the monitor or the like is approximately 100 ms.

As described above, according to the vehicle-mounted camera system for image display 100 of the first embodiment, it is possible to shorten the input and output delay times of the camera controller and the time difference in timings of presenting a plurality of camera images on the monitor, compared with the case of starting the address conversion processing frame by frame. Therefore, it is possible to decrease the amount of disagreement between the actual move of a vehicle and an image on the monitor, the disagreement being generated due to the long input and output delay times, and to avoid giving the feeling of discomfort to the driver.

In addition, it is possible to reduce a difficulty in recognizing a relatively moving object, the difficulty generated due to the foregoing time difference.

Specifically, as described above with reference to FIG. 6, the time required for synchronization in the input buffer can be made a delay equivalent to three fields at the maximum. Further, the whole delay time in the camera controller can be made 66.7 ms equivalent to four fields at the maximum. Thus, the whole delay time can be shortened to two-thirds compared with a delay time (100 ms) of when the address conversion processing is performed frame by frame.

Moreover, according to the vehicle-mounted camera system for image display 100, since the address conversion processing is started field by field, it is possible to decrease the capacity of the input buffer, compared with a case of the address conversion processing frame by frame. While an input buffer provided with an address space equivalent to three frames×"n" cameras in case of performing the processing frame by frame, the camera controller can achieve the address conversion processing with the input buffer provided with an address space equivalent to three fields (1.5 frames)×"n" cameras and can decrease the buffer capacity to the half.

Furthermore, with the vehicle-mounted camera system for image display 100, since the image data of the odd- and even-numbered fields is alternately written into the input plane of the output buffer, it is possible to prevent the odd- and even-numbered fields from being replaced, and to reduce flicker in the image on the monitor to be presented to the driver.

Note that the vehicle-mounted camera system for image display 100 employs an improved control method of the address conversion processing in the camera controller 120, which does not make other device configurations and the like larger or more complicated.

Second Embodiment

A description will be given of a second embodiment of the present invention with reference to FIGS. 8 to 14.

It is possible to shorten the maximum delay time from the imaging to the display with the above-mentioned vehicle-mounted camera system for image display 100 of the first embodiment. However, as shown in FIG. 6, the difference in the imaging timing between the simultaneously displayed images of the cameras #1 and #2, that is, the time difference of each camera image is approximately 33.3 ms at the maximum, which is equivalent to the difference between the time t1 and the time t2. The time difference of each camera image in the method of performing the address conversion processing frame by frame, too, is approximately 33.3 ms at the maximum as shown in FIG. 7. Regarding this point, the vehicle-mounted camera system for image display 100 of the first embodiment is not improved.

A description will be given of a vehicle-mounted camera system for image display which shortens even the time difference between images of a plurality of cameras as the second embodiment of the present invention.

Note that the configuration and the like of a vehicle-mounted camera system for image display 100b of the second embodiment (see FIG. 3) is the same as those of the above-mentioned vehicle-mounted camera system for image display 100 of the first embodiment with reference to FIGS. 1A-1B to 3. Accordingly, concerning the vehicle-mounted camera system for image display of the second embodiment, a description will hereinafter be omitted of its configuration and the like, and the same reference characters as those of the first embodiment is used when describing the same members.

Figure 8:
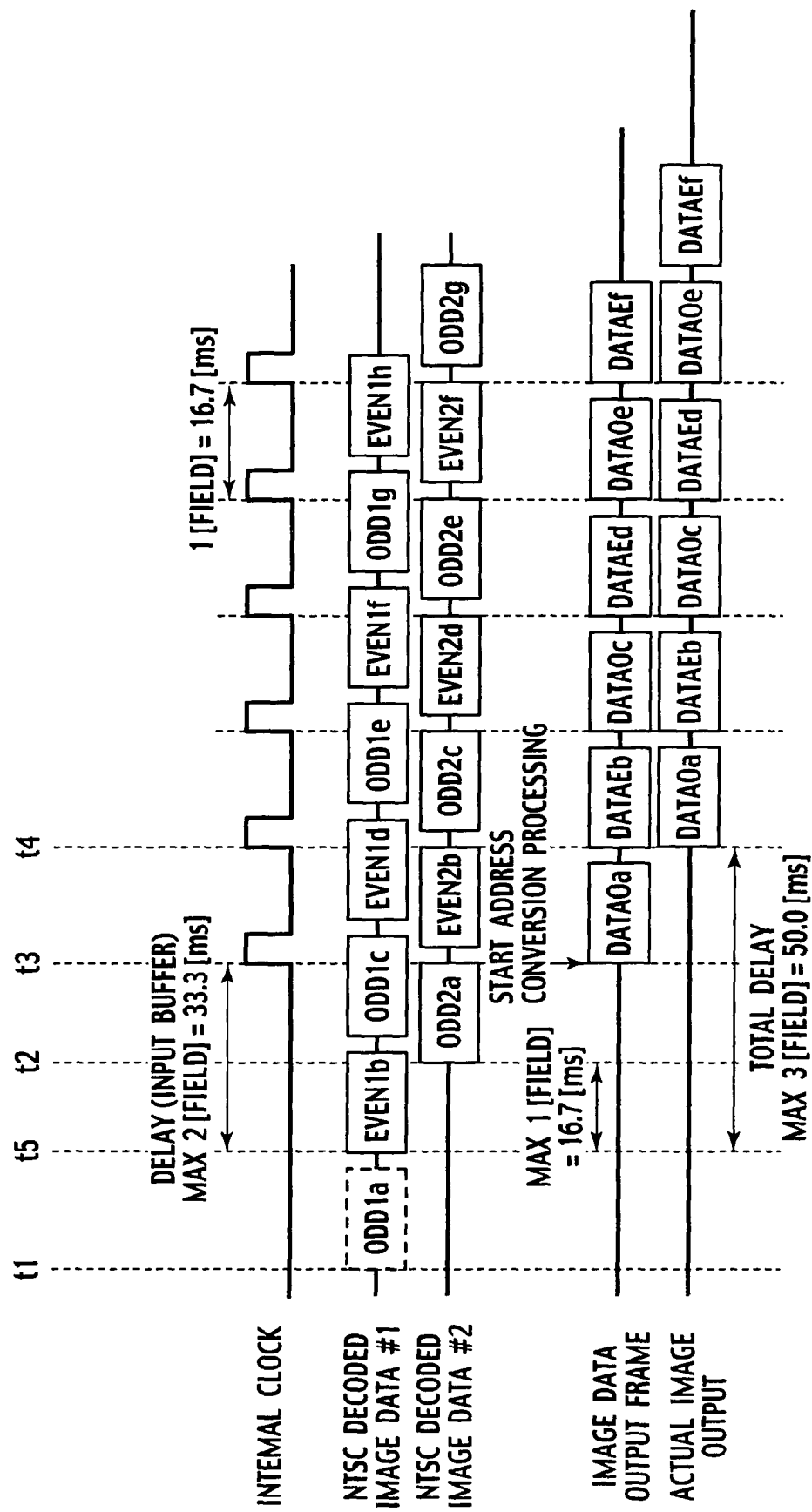
FIG. 8 is a view showing a timing chart of input and output data of a vehicle-mounted camera system for image display of a second embodiment of the present invention.

In the vehicle-mounted camera system for image display 100b of the second embodiment, as shown in FIG. 8, the image data of even-numbered field data Even1b of a camera #1 and of odd-numbered field data Odd2a of a camera #2 is used to create DataOa which is odd-numbered field data. Moreover, the image data of the odd-numbered field data Odd1c of the camera #1 and of the even-numbered field data Even2b of the camera #2 is used to create DataEb which is even-numbered field data in an output monitor.

Address conversion processing is performed in the same manner as the above-mentioned first embodiment in this case, too. In other words, in order to create DataOa which is the odd-numbered field data in the output monitor, the address conversion is performed on the image data of the even-numbered field data Even1b of the camera #1 and of the odd-numbered field data Odd2a of the camera #2, by use of the data (the address values) in an output buffer write address region for odd-numbered field 161, a camera number region for odd-numbered field 163 and an input buffer read address region for odd-numbered field 162, the three regions being in a pattern memory 160. In addition, in order to create DataEb which is the even-numbered field data in the output monitor, the address conversion processing is performed on the image data of the odd-numbered field data Odd1c of the camera #1 and of the even-numbered field data Even2b of the camera #2, by use of the data (the address values) in an output buffer write address region for even-numbered field 164, a camera number region for even-numbered field 166 and an input buffer read address region for even-numbered field 165, the three regions being in the pattern memory 160.

Figure 9:
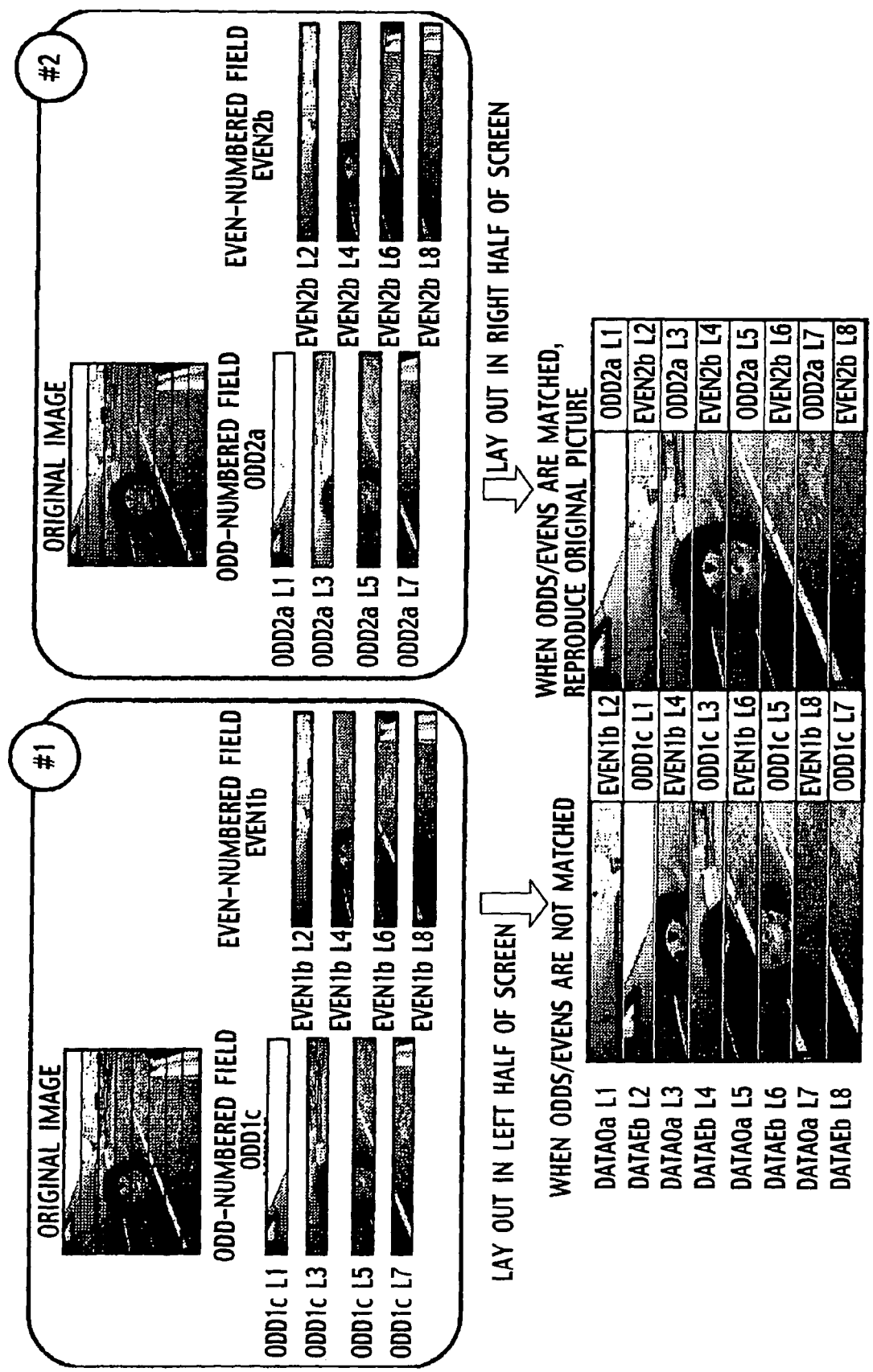
FIG. 9 is a conceptual diagram of a case of performing conventional address conversion processing field by field.

With regard to this case, FIG. 9 shows a conceptual diagram of a case where the address conversion is performed by use of an address conversion table identical to that of the first embodiment. FIG. 9 is a layout for assigning the image data of the cameras #1 and #2 to the left and right halves of the monitor, respectively.

Note that, in FIG. 9, it is assumed that the image data that each camera is imaging is the same and that the numbers of pixels in the vertical directions of a camera image and a monitor output are eight, so as to facilitate a description below.

In this case, as shown in FIG. 9, it is possible to reproduce the original image of the camera #2 in terms of the image of the camera #2 that the odd-numbered field of the output monitor is created by use of the odd-numbered field of the camera and that the even-numbered field of the output monitor is created by use of the even-numbered field of the camera, that is, the output of the right half of the monitor (lines 1 to 8 of the original image are arranged sequentially). However, it still is not possible to reproduce the original image of the camera #1 in terms of the image of the camera #1 that the odd-numbered field of the output monitor is created by use of the even-numbered field of the camera and that the even-numbered field of the output monitor is created by use of the odd-numbered field of the camera, that is, the output of the left half of the monitor (lines 1 to 8 of the original image are not arranged sequentially).

Figure 10:
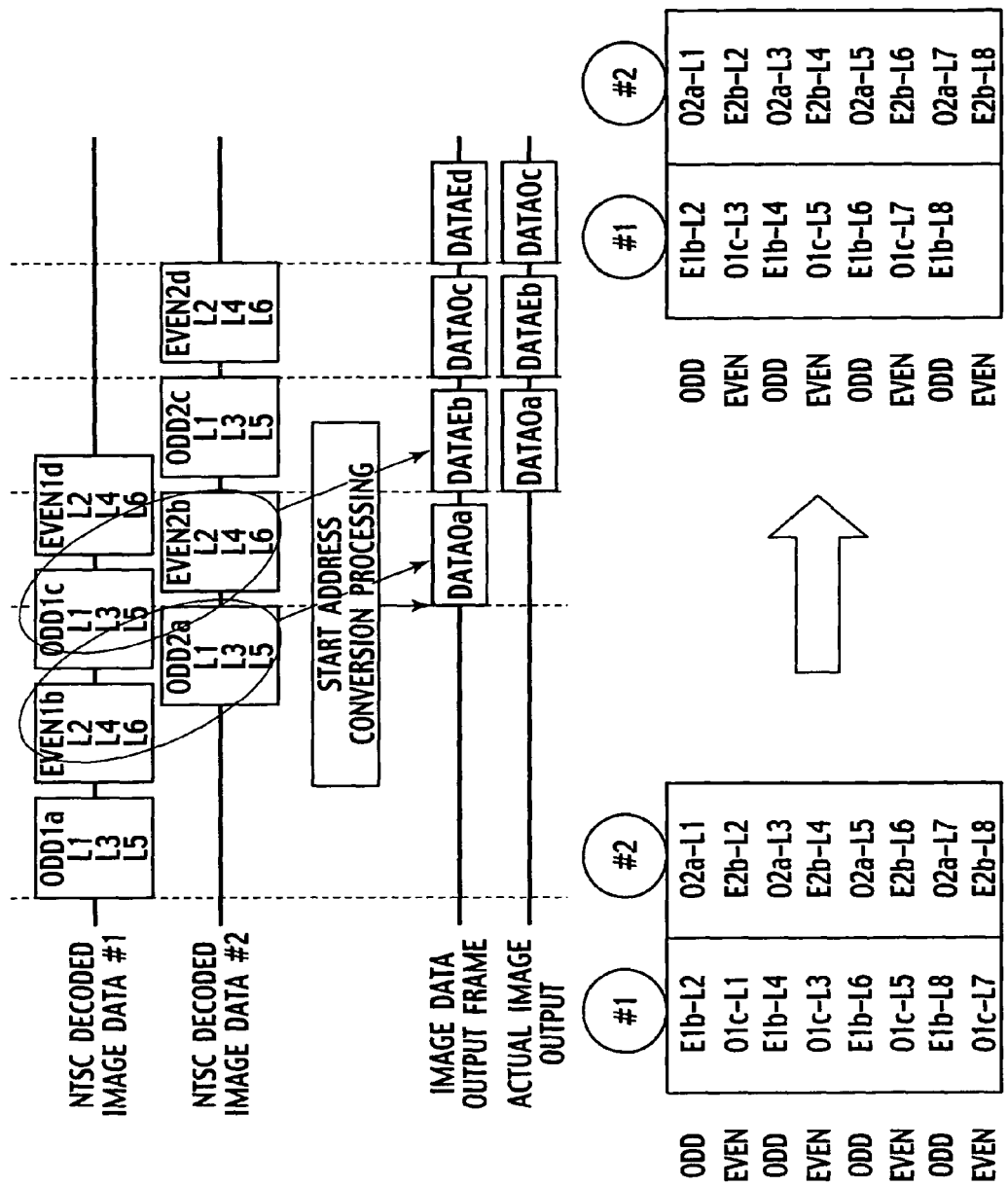
FIG. 10 is a view for explaining processing in the vehicle-mounted camera system for image display of the second embodiment of the present invention.

With reference to FIG. 10, a description will be given of the address conversion processing in the vehicle-mounted camera system for image display 100b of this embodiment for solving such a problem and displaying an appropriate image, regarding the output of the left half of the monitor, too.

FIG. 10 is a conceptual diagram for explaining the address conversion processing in the vehicle-mounted camera system for image display 100b of the second embodiment.

A CPU 140 of a camera controller 120 of the vehicle-mounted camera system for image display 100b of the second embodiment targets the temporally closest field image data among field video signals transmitted from NTSC cameras 110a and 110b for the address conversion processing, respectively.

At this point, the CPU 140 of the camera controller 120 determines whether each field image data inputted from the NTSC cameras 110a and 110b is the odd- or even-numbered field data, and then the address conversion processing is switched based on a relationship with an output target field.

Specifically, Firstly, when writing into an output buffer for odd-numbered field (when generating the output image data of the odd-numbered field), if the type of the temporally closest field image data is the odd-numbered field data with regard to both of the cameras #1 and #2, the address conversion processing is performed by use of pattern memory data for the odd-numbered field of the pattern memory 160 in this case, as in the above. Thus, the output data for the odd-numbered field is created.

In this case, when writing into an output buffer for the even-numbered field (when generating the output image data of the even-numbered field), the type of the temporally closest field image data is the even-numbered field data with regard to both of the cameras #1 and #2. Hence, also in that case, the address conversion processing is performed by use of the pattern memory data for the even-numbered field of the pattern memory 160 this time, as in the above. Thus, the output data for the even-numbered field is created.

On the other hand, when writing into the output buffer for the odd-numbered field (when generating the output image data of the odd-numbered field), if the temporally closest field data is the even-numbered field data with regard to the camera #1 and the odd-numbered field data with regard to the camera #2 (as is in the case shown in FIG. 10), the camera controller 120 performs the following processing. Note that, in FIG. 10, the image data of the even-numbered field data Even1b of the camera #1 and of the odd-numbered field data Odd2a of the camera #2 is used to create DataOa which is the odd-numbered field data in the output monitor. The image data of the odd-numbered field data Odd1c of the camera #1 and of the even-numbered field data Even2b of the camera #2 is used to create DataEb which is the even-numbered field data in the output monitor.

When creating DataOa which is the odd-numbered field data in the output monitor, the CPU 140 performs the address conversion processing on the image data of the even-numbered field data Even1b of the camera #1 and of the odd-numbered field data Odd2a of the camera #2, by use of the pattern memory for the odd-numbered field, and then stores the output data in the output buffer.

Next, when creating DataEb which is the even-numbered field data in the output monitor by use of the image data of the odd-numbered field data Odd1c of the camera #1 and of the even-numbered field data Even2b of the camera #2, the CPU 140 uses the data of line data L3 in the second line (the third line in the whole image) in the odd-numbered field data (Odd1c) of the camera #1 and below. In other words, as shown in FIG. 10, the whole odd-numbered field data is arranged in a manner that the data L3 in the second line in the odd-field data Odd1c is arranged below the first line in the odd-numbered field of the output data, as the data in the first line (the second line in the whole image) in the even-numbered field of the output data.

As a result, the line data L3 in the second line in the odd-number field data Odd1c of the camera #1 is arranged below line data L2 in the first line in the even-numbered field data Even1b of the camera #1, which is previously stored as the first line of the output data. Thus, the relative positional relationship of each line is made to be appropriate.

In this manner, in the vehicle-mounted camera system for the image display in this embodiment, when outputting the even-numbered field data of the output data (generating the data by the address conversion), if the camera input field data is the odd-numbered field data, the address conversion is performed, starting reading out from one line below.

Figure 11:
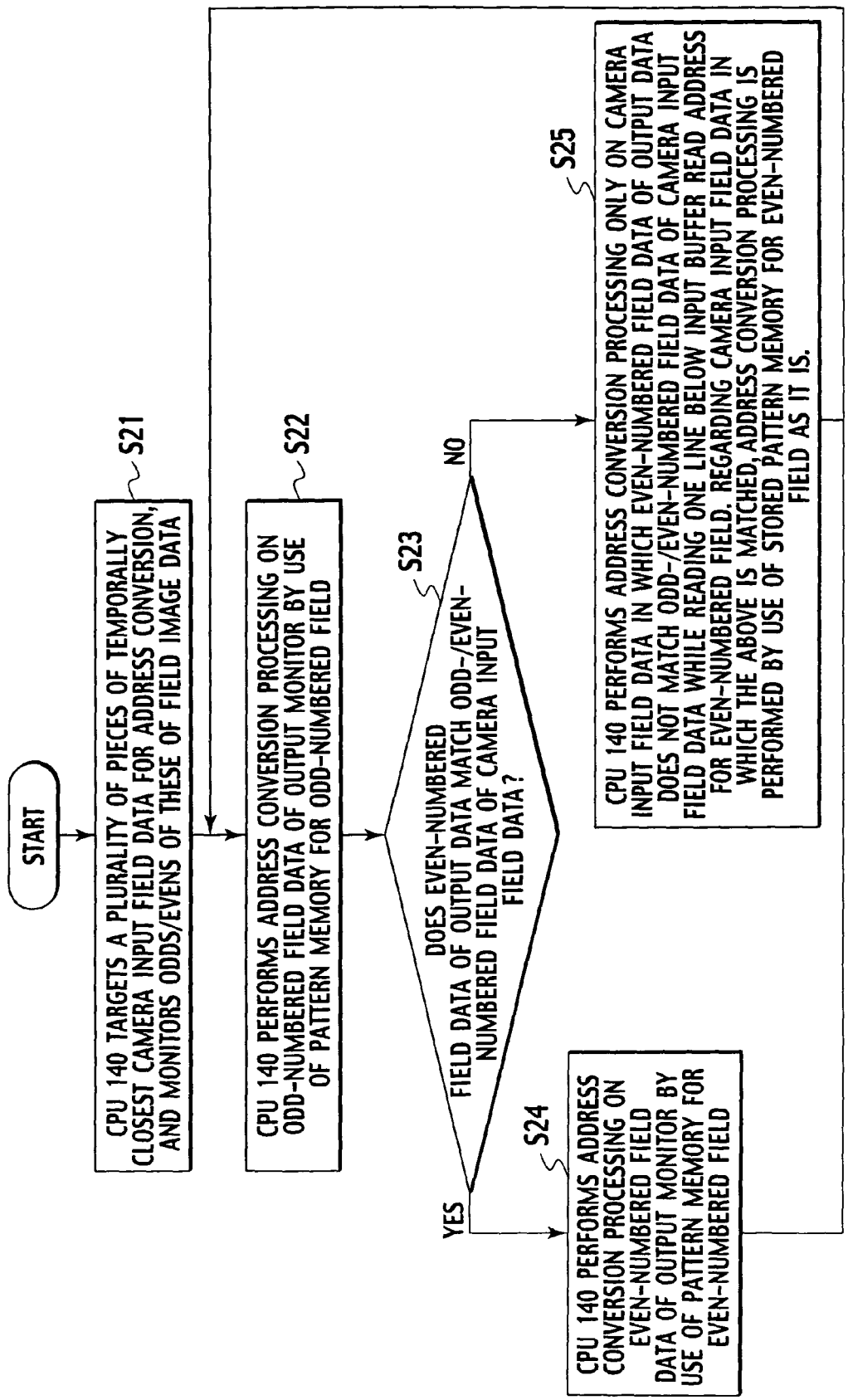
FIG. 11 is a flowchart showing a flow of the processing in the vehicle-mounted camera system for image display of the second embodiment of the present invention.

FIG. 11 is a flowchart showing the address conversion processing of the camera controller.

The CPU 140 targets a plurality of pieces of the temporally closest camera input data for the address conversion. In addition, these of the field image data are monitored whether to be the odd- or even-numbered field data of an original camera image (Step S21).

After synchronizing the field data from each camera, the CPU 140 performs the address conversion processing on the odd-numbered field data of the output monitor by use of the pattern memory for the odd-numbered field regardless of the monitoring result in Step S21 (Step S22).

After creating the odd-numbered field data in the output monitor and synchronizing with the next field data, the CPU 140 determines whether the even-numbered field data of the output data and the odd-/even-numbered field data (the odd or even) of the camera input field data are matched (Step S23).

When matched, the CPU 140 performs the address conversion processing by using the pattern memory for the even-numbered field data as it is, and then creates the even-numbered field data in the output monitor (Step S24).

When not matched, the CPU 140 performs the address conversion processing on only the camera input field data in which the even-numbered field data of the output data does not match the odd-/even-numbered field data of the camera input field data, by reading out one line below the input buffer read address for the even-numbered field data. Additionally, the address conversion processing is performed on the camera input field data whose odd or even of the field data matches by using the stored pattern memory for the even-numbered field as it is (Step S25).

Note that as a method of reading out one line below the input buffer read address, considered are methods such as one in which the address for one line is added to the read address value when the CPU 140 reads the input buffer read address region for even-numbered field 165 of the pattern memory 160.

Figure 12:
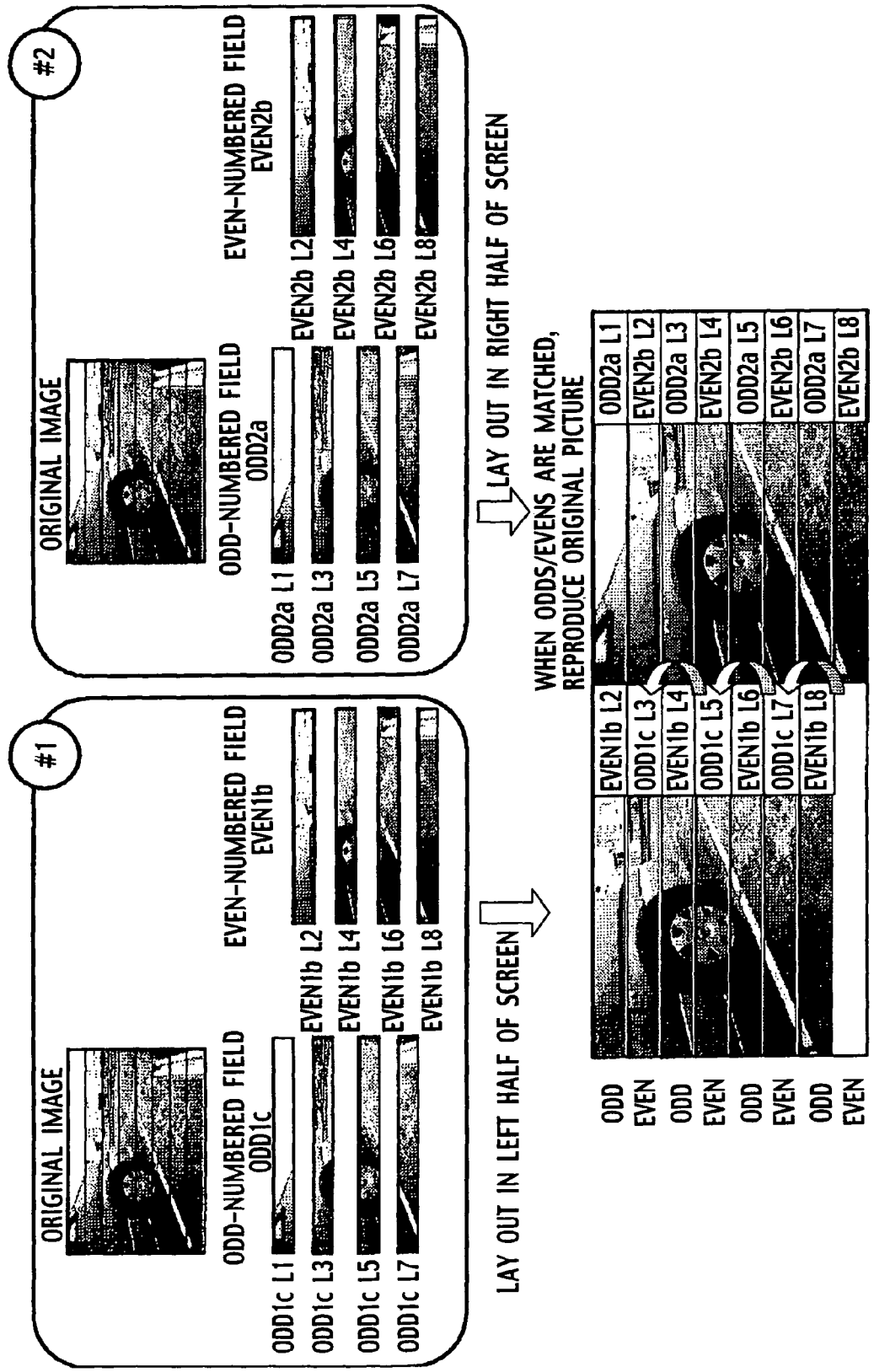
FIG. 12 is a conceptual diagram of a case of performing address conversion processing field by field in the vehicle-mounted camera system for image display of the second embodiment of the present invention.

FIG. 12 is a view showing an example of the result of performing the address conversion processing with such a method.

In order to create DataOa which is the odd-numbered field data in the output monitor, the address conversion processing is performed on the image data of the even-numbered field data Even1b of the camera #1 and of the odd-numbered field data Odd2a of the camera #2 by use of the pattern memory for the odd-numbered field. Further, in order to create DataEb which is the even-numbered field data in the output monitor, the address conversion processing is performed on the image data of the odd-numbered field data Odd1c of the camera #1 and of the even-numbered field data Even2b of the camera #2 by use of the pattern memory for the even-numbered field.

At this point, as illustrated, it is possible to appropriately reproduce the original images by performing the above-mentioned processing in terms of: the image of the camera #2 that the odd-numbered-field of the output monitor is created by use of the odd-numbered-field of the camera and that the even-numbered field of the output monitor is created by use of the even-numbered field of the camera, that is, the output of the right half of the monitor; and the image of the camera #1 that the odd-numbered filed of the output monitor is created by the use of the even-numbered filed of the camera and that the even-numbered filed of the output monitor is created by use of the odd-numbered filed of the camera, that is, the output of the left half of the monitor. In other words, the lines 1 to 8 of the original image are arranged sequentially.

Note that although the last line of the even-numbered field data of the output of the left half of the monitor is lacked, one that the number of pixels is large in the vertical direction, such as, for example, VGA output, has little effect on human feeling in the sense of sight.

In this manner, according to the vehicle-mounted camera system for image display 100b of the second embodiment, as shown in the input and output timechart in FIG. 8, the difference between a time t5 when starting the reception of the image data of the even-numbered field data Even1b from the camera #1 and the time t2 when starting the reception of the image data of the odd-numbered field data Odd2a of the camera #2, that is, the time difference of each camera image, is shortened for the amount of one field at the maximum, that is, is shortened to 16.7 ms at the maximum, which is equivalent to one field.

Furthermore, it is possible to make the delay due to the synchronization in the input buffer two fields (33.3 ms) at the maximum (t5 to t3). Additionally, the whole delay time from the time t5 when starting the input of the input data of the camera #1 to a time t4 when outputting and displaying the output data to and on the monitor and the like can be shortened for the amount of three fields (50.0 ms) at the maximum.

Accordingly, the input and output delay time of the camera controller and the time difference at the time of presenting a plurality of camera images on the monitor can be dramatically shortened, compared with the case of starting the address conversion processing frame by frame. Consequently, it is possible to suppress the disagreement between the actual move of a vehicle and the image on the monitor, the disagreement being caused due to long input and output delay times, and to avoid giving the feeling of discomfort to the driver. Moreover, the difficulty in recognizing an object which is moving relatively, the difficulty being generated due to the above-mentioned time difference.

Furthermore, since the address conversion processing is started field by field also in the vehicle-mounted camera system for image display 100b, as in the vehicle-mounted camera system for image display 100 of the first embodiment, it is possible to decrease the capacity of the input buffer, compared with the case of starting the address conversion processing frame by frame. When performing the processing frame by frame, the input buffer provided with an address space for 3 frames×"n" cameras is required. On the other hand, with the camera controller, it is possible to achieve the address conversion processing with the input buffer provided with an address space for 3 fields (1.5 frames)×"n" cameras, thus making it possible to reduce the buffer capacity to the half.

Note that it is possible to achieve the present invention without depending on the number of cameras to be connected.

Note that as a timing of performing the address conversion processing and a timing of presenting the output data on the monitor, a vertical synchronizing signal included in the video signal which is transmitted from the camera may be used in the camera controller as a trigger signal, or a trigger signal generated inside may be used.

Third Embodiment

A description will be given of a third embodiment of the present invention with reference to FIGS. 13 and 14.

A vehicle-mounted camera system for image display of the third embodiment is one in which the method of address conversion processing of the vehicle-mounted camera system for image display of the second embodiment is modified.

Figure 13:
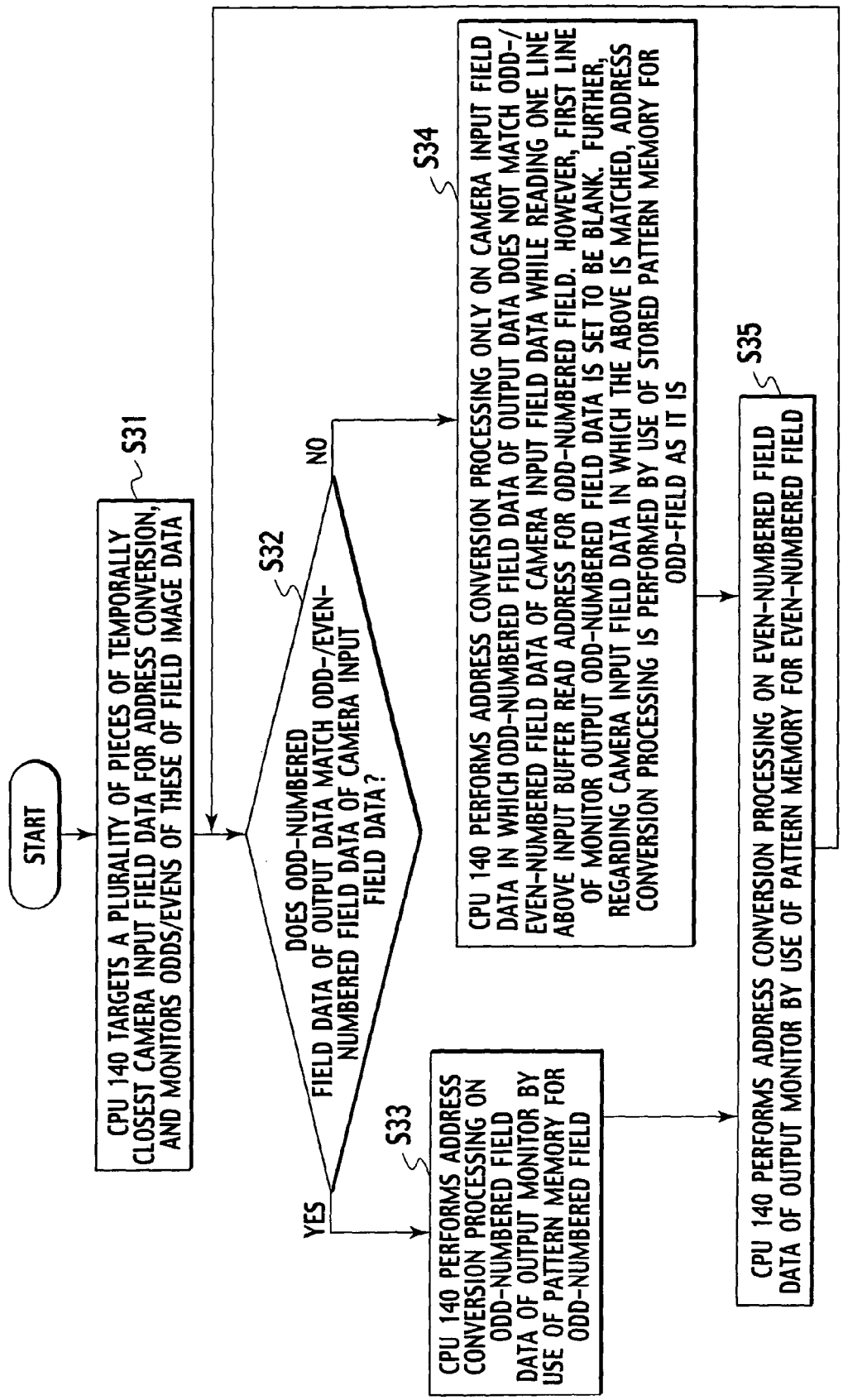
FIG. 13 is a flowchart showing a flow of processing in a vehicle-mounted camera system for image display of a third embodiment of the present invention.

FIG. 13 is a flowchart showing address conversion processing of a camera controller in the third embodiment.

A CPU 140 targets a plurality of temporally closest camera input data for the address conversion. Additionally, these of the field image data are monitored whether to be the odd- or even-numbered field data of an original camera image (Step S31).

After the synchronization of the input field data, the CPU 140 determines whether the odd-numbered field data of the output data matches the odd- and even-numbered field data of the camera input field data (Step S32).

When matched, the CPU 140 performs the address conversion processing by using a pattern memory for the odd-numbered field as it is, thus creating the odd-numbered field in an output monitor (Step S33).

When not matched, the CPU 140 performs the address conversion processing only on the camera input field data in which the odd-numbered field data of the output data does not match the odd-/even-numbered field data of the camera input field data while reading one line above the input buffer read address for the odd-numbered field. However, the processing is performed in a manner that the first line of the monitor output odd-numbered field data is set to be blank (the address conversion processing is not performed). On the other hand, the address conversion processing is performed on the camera input field data in which the above is matched, by using the stored pattern memory for the odd-numbered field as it is (Step S34).

Note that as a method of reading one line above the input buffer read address, considered are methods such as one in which the address for the amount of one line is subtracted from the read address value when the CPU 140 reads an output buffer write address region for even-numbered field 164 of a pattern memory 160.

After the odd-numbered field data in the output monitor is created, and the next field data is synchronized, the CPU 140 performs the address conversion processing on the even-numbered field data of the output monitor by use of a pattern memory for the even-numbered field regardless of the monitoring result in Step S31 (Step S35).

Figure 14:
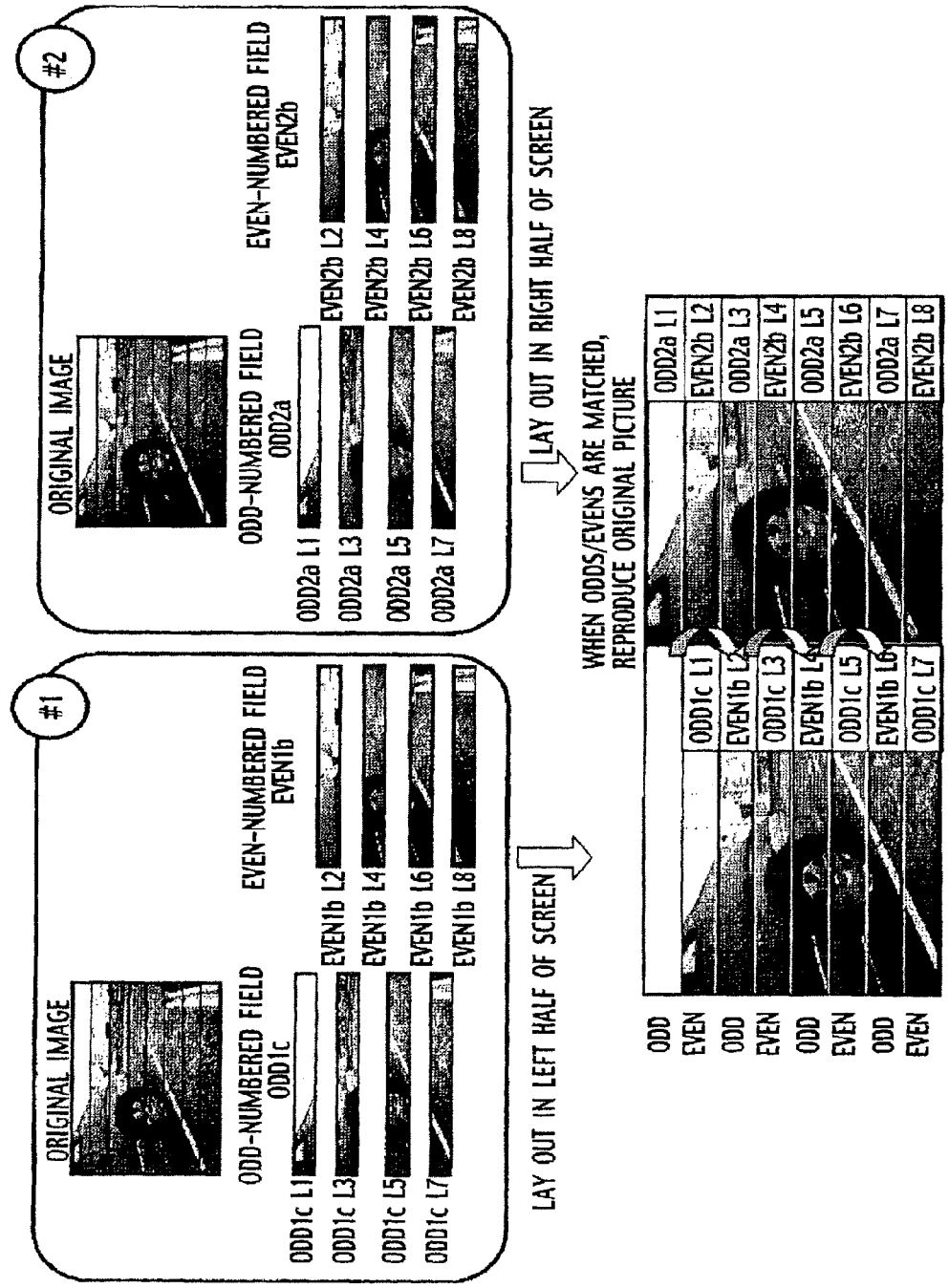
FIG. 14 is a conceptual diagram of a case of performing address conversion processing field by field in the vehicle-mounted camera system for image display of the third embodiment of the present invention.

FIG. 14 is a view showing an example of a result of performing the address conversion processing by use of such a method.

In order to create DataOa which is the odd-numbered field data in the output monitor, the address conversion processing is performed on the image data of even-numbered field data Even1*b* of a camera #1 and of odd-numbered field data Odd2*a* of a camera #2 by use of the pattern memory for the odd-numbered field. In addition, in order to create DataEb which is the even-numbered field data in the output monitor, the address conversion processing is performed on the image data of odd-numbered field data Odd1*c* of the camera #1 and of even-numbered field data Even2*b* of the camera #2 by use of the pattern memory for the even-numbered field.

At this point, as illustrated, it is possible to appropriately reproduce the original images by performing the above-mentioned processing in terms of: the image of the camera #2 that the odd-numbered-field of the output monitor is created by use of the odd-numbered-field of the camera and that the even-numbered field of the output monitor is created by use of the even-numbered field of the camera, that is, the output of the right half of the monitor; and the image of the camera #1 that the odd-numbered filed of the output monitor is created by the use of the even-numbered filed of the camera and that the even-numbered filed of the output monitor is created by use of the odd-numbered filed of the camera, that is, the output of the left half of the monitor. In other words, the lines 1 to 8 of the original image are arranged sequentially.

Note that although the first line of the odd-numbered field data of the output of the left half of the monitor is lacked, one whose number of pixels are large in the vertical direction, such as, for example, VGA output, as in the previous case has little effect on human feeling in the sense of sight.

With such a method, even when the address conversion is performed, it is possible to shorten the time difference of each camera image by the amount of one field at the maximum, in other words, to shorten to 16.7 ms. Additionally, it is possible to shorten the delay of the display image by the amount of three fields (50.0 ms) at the maximum as in the second embodiment.

Moreover, since the address conversion processing is performed field by field, it is possible to reduce the capacity of the input buffer to the half, compared with the case of performing the processing frame by frame.

Fourth Embodiment

A description will be given of a fourth embodiment of the present invention with reference to FIG. 15.

The above-mentioned vehicle-mounted camera systems for image display of the second and third embodiments handles the following case by changing the address conversion processing with an ordinary one: a case where at least one of camera input field data targeted for address conversion upon creating the even-numbered field data of a monitor output is odd-numbered field data; or a case where at least one of the camera input field data targeted for the address conversion upon creating the odd-numbered field data of the monitor output is the even-numbered field data. However, for example, when the number of cameras to be connected is four and three out of four pieces of camera input field data targeted for the address conversion upon creating the odd-numbered field data of the monitor output are the even-numbered field data (and vice versa) read processing of an input buffer read address performed in a CPU becomes heavy. Therefore, the load of the CPU may increase. Hence, in this embodiment, a description will be given of processing for changing the odd-/even-numbered field data of the monitor output to be created in accordance with the odd-/even-numbered field data of the camera input field data, which does not have reproducibility.

Figure 15:
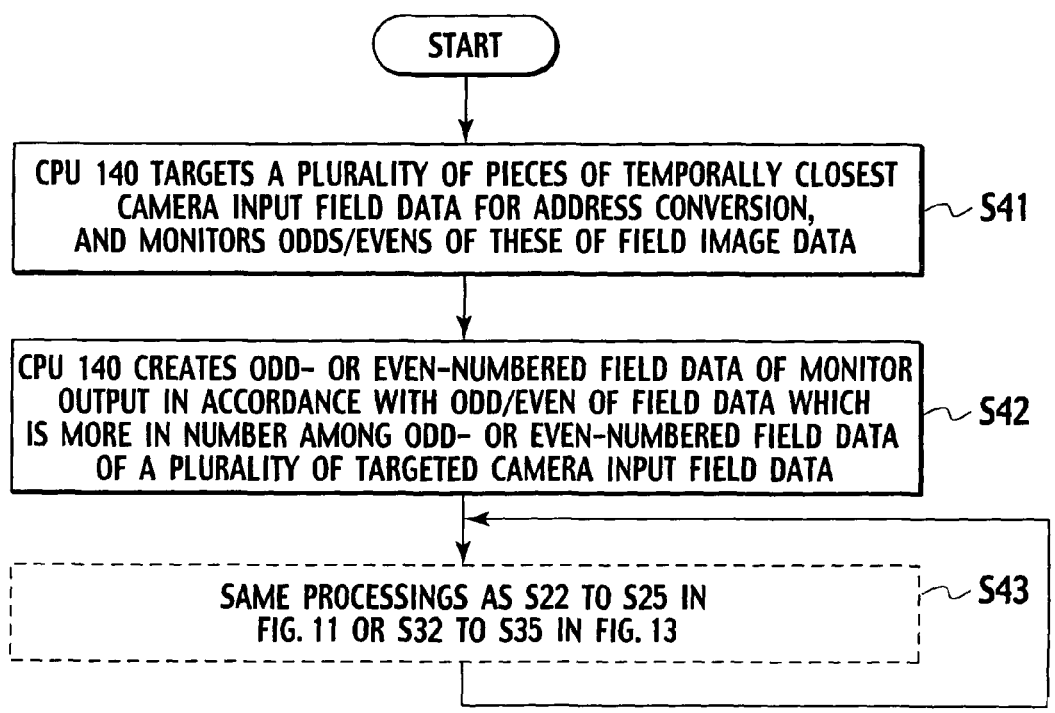
FIG. 15 is a flowchart showing a flow of processing in a vehicle-mounted camera system for image display of a fourth embodiment of the present invention.

FIG. 15 is a flowchart showing the address conversion processing of a camera controller in this embodiment.

A CPU 140 targets a plurality of pieces of temporally closest camera input data for address conversion. Furthermore, these of the field image data are monitored whether to be the odd- or even-numbered field data of an original image (Step S41)

The CPU 140 creates the odd- or even-numbered field data of the monitor output in accordance with the odd/even of the field data which is more than the other among the odd- or even-numbered field data of a plurality of targeted camera input field data. As an example, when the number of cameras to be connected is four, if there are three pieces of the odd-numbered field data among the camera input field data targeted for the address conversion, the monitor output odd-numbered field data is started to be created. Additionally, if there are three even-numbered field data, a monitor output even-numbered field data is started to be created. Incidentally, when the numbers of both odd- and even-numbered field data are the same number such as two, the monitor output odd-numbered field data is started to be created (Step S42).

Concerning the following processes, the same processes are performed as those of Steps S22 to S25 in FIG. 11, or those of Steps S32 to S35 in FIG. 13 (Step S43).

According to the above, it is possible to gain the same effect as the second and third embodiments while reducing the processing load of a CPU.

Further, as long as with such a configuration, it is possible to reduce the load of the CPU, especially, since the operation amount of the corresponding relationship to be stored in a pattern memory 160 is reduced.

The preferred embodiments described herein are illustrative and not restrictive, and the invention may be practiced or embodied in other ways without departing from the spirit or essential character thereof.

For example, in the above-mentioned vehicle-mounted camera system for image display of each embodiment, a synchronizing signal for outputting to a display monitor already converted field image data which is stored in an output plane of an output buffer may be generated by use of a clock circuit including an unillustrated frequency source inside, or may be generated by a circuit using a vertical synchronizing signal including the field image data to be inputted. In any case, it is possible to present the output data to a driver at an arbitrary timing by detecting the completion of the address conversion processing by use of an arbitrary output trigger.

Moreover, the present invention may have a configuration in which a timing of the output to a display monitor 180 is to be selected from a case of generation from the frequency source inside and a case of generation from the vertical synchronizing signal. With the configuration of this kind, it is possible to make a timing of presenting field image data to a driver changeable in accordance with a time required for address conversion processing. In addition, when the accurate detection is not possible since a noise is included in the vertical synchronizing signal, it is possible to achieve the synchronization with a high reliability if the frequency source inside is used. Furthermore, when the vertical synchronizing signal is used, it is possible to make the clock circuit inside unnecessary.

Additionally, at that point, if it is configured to determine a conversion processing timing and an output timing at the same timing, it is possible to integrate timing circuits. Accordingly, it is possible to downsize the circuit size and to simplify the address conversion processing. Such a configuration may be employed for the vehicle-mounted camera system for image display according to the present invention. Further, the imaging system is not limited to NTSC, but may be PAL.

The scope of the invention being indicated by the claims, and all variations which come within the meaning of claims are intended to be embraced herein.

The present disclosure relates to subject matters contained in Japanese Patent Application No. 2004-373195, filed on Dec. 24, 2004, the disclosure of which is expressly incorporated herein by reference in its entirety.

What is claimed is:

1. A video signal processing device, comprising:
    a plurality of imaging devices configured to output mutually asynchronous interlace video signals, each interlace video signal comprising a video signal of an odd-numbered field and a video signal of an even-numbered field;
    input buffers configured to temporarily store field by field the interlace video signals outputted from the respective imaging devices; and
    an output image generating device configured to generate field by field video signals of output target images from the interlace video signals stored in the input buffers,
    wherein the output image generating device is configured to generate each of the video signals of the output target images when all latest video signals to be components thereof are stored in the input buffers, wherein the latest video signals to be components of each of the video signals of the output target images include the video signal of the odd-numbered field and the video signal of the even-numbered field stored in the input buffers,
    wherein the output image generating device is configured to change how to generate the video signals of the output target images according to whether a latest video signal stored in the input buffer is the video signal for the odd-numbered field or the video signal for the even-numbered field, and
    wherein, when generating a video signal of an output target image of an even-numbered field from a video signal of an odd-numbered field stored in the input buffer, the output image generating device is configured to shift an image of the video signal of the odd-numbered field of the input buffer upward by one line of a field to generate the video signal of the output target image.

2. The video signal processing device according to claim 1, wherein the input buffers are provided to each of the imaging devices, and each of the input buffers comprises three storage sections each configured to store a video signal for one field, and
    wherein the three storage sections are sequentially set to be a first storage section to first store incoming video signals outputted from the corresponding imaging device, a second storage section in which the incoming video signals wait in a stored state, and a third storage section from which the stored video signals are read out by the output image generating device.

3. The video signal processing device according to claim 1, further comprising:
    an output buffer configured to store field by field the generated video signals of the output target images; and
    an address table configured to store a corresponding relationship between memory addresses in the output buffer and memory addresses in the input buffers,
    wherein the output image generating device is configured to generate the video signals of the output target images by transmitting the interlace video signals stored in the input buffers to predetermined parts in the output buffer based on the address table.

4. A vehicle-mounted camera system, comprising:
    the video signal processing device according to claim 1, wherein the plurality of imaging devices image areas around a vehicle;
    an output buffer configured to store field by field the generated video signals of the output target images; and
    a display device configured to display the video signals stored in the output buffer to a driver of the vehicle.

5. A video signal processing device, comprising:
    a plurality of imaging devices configured to output mutually asynchronous interlace video signals, each interlace video signal comprising a video signal of an odd-numbered field and a video signal of an even-numbered field;
    input buffers configured to temporarily store field by field, the interlace video signals outputted from the respective imaging devices; and
    an output image generating device configured to generate field by field video signals of output target images from the interlace video signals stored in the input buffers,
    wherein the output image generating device is configured to generate each of the video signals of the output target images when all latest video signals to be components thereof are stored in the input buffers, wherein the latest video signals to be components of each of the video signals of the output target images include the video signal of the odd-numbered field and the video signal of the even-numbered field stored in the input buffers,
    wherein the output image generating device is configured to change how to generate the video signals of the output target images according to whether a latest video signal stored in the input buffer is the video signal for the odd-numbered field or the video signal for the even-numbered field, and
    wherein, when generating a video signal of an output target image of an odd-numbered field from a video signal of an even-numbered field stored in the input buffer, the output image generating device is configured to shift an image of the video signal of the even-numbered field of the input buffer downward by one line of a field to generate the video signal of the output target image.

6. The video signal processing device according to claim 5, wherein the input buffers are provided to each of the imaging devices, and each of the input buffers comprises three storage sections each configured to store a video signal for one field, and wherein the three storage sections are sequentially set to be a first storage section to first store incoming video signals outputted from the corresponding imaging device, a second storage section in which the incoming video signals wait in a stored state, and a third storage section from which the stored video signals are read out by the output image generating device.

7. The video signal processing device according to claim 5, further comprising:

an output buffer configured to store field by field the generated video signals of the output target images; and an address table configured to store a corresponding relationship between memory addresses in the output buffer and memory addresses in the input buffers, wherein the output image generating device is configured to generate the video signals of the output target images by transmitting the interlace video signals stored in the input buffers to predetermined parts in the output buffer based on the address table.

8. A vehicle-mounted camera system, comprising:

the video signal processing device according to claim 5, wherein the plurality of imaging devices image areas around a vehicle;

an output buffer configured to store field by field the generated video signals of the output target images; and a display device configured to display the video signals stored in the output buffer to a driver of the vehicle.

9. A video signal processing device, comprising:

a plurality of imaging devices configured to output mutually asynchronous interlace video signals, each interlace video signal comprising a video signal of an odd-numbered field and a video signal of an even-numbered field;

input buffers configured to temporarily store field by field the interlace video signals outputted from the respective imaging devices; and an output image generating device configured to generate field by field video signals of output target images from the interlace video signals stored in the input buffers, wherein the output image generating device is configured to generate each of the video signals of the output target images when all latest video signals to be components thereof are stored in the input buffers, wherein the latest video signals to be components of each of the video signals of the output target images include the video signal of the odd-numbered field and the video signal of the even-numbered field stored in the input buffers, and wherein the output image generating device is configured to:

determine whether each of the latest video signals stored in the input buffers is the video signal for the odd-numbered field or the video signal for the even-numbered field;

generate the video signal of the output target image for the odd-numbered field, when a number of video signals for the odd-numbered fields is more than a number of video signals for the even-numbered fields among the latest video signals in the input buffers; and generate the video signal of the output target image for the even-numbered field, when the number of video signals for the even-numbered fields is more than the number of video signals for the odd-numbered fields among the latest video signals in the input buffers.

10. The video signal processing device according to claim 9, wherein the input buffers are provided to each of the imaging devices, and each of the input buffers comprises three storage sections each configured to store a video signal for one field, and wherein the three storage sections are sequentially set to be a first storage section to first store incoming video signals outputted from the corresponding imaging device, a second storage section in which the incoming video signals wait in a stored state, and a third storage section from which the stored video signals are read out by the output image generating device.

11. The video signal processing device according to claim 9, further comprising;

an output buffer configured to store field by field the generated video signals of the output target images; and an address table configured to store a corresponding relationship between memory addresses in the output buffer and memory addresses in the input buffers, wherein the output image generating device is configured to generate the video signals of the output target images by transmitting the interlace video signals stored in the input buffers to predetermined parts in the output buffer based on the address table.

12. A vehicle-mounted camera system, comprising:

the video signal processing device according to claim 9, wherein the plurality of imaging devices image areas around a vehicle;

an output buffer configured to store field by field the generated video signals of the output target images; and a display device configured to display the video signals stored in the output buffer to a driver of the vehicle.

13. A method for video signal processing, comprising:

temporarily storing field by field mutually asynchronous interlace video signals outputted from a plurality of imaging devices in input buffers, each interlace video signal comprising a video signal of an odd-numbered field and a video signal of an even-numbered field;

generating field by field video signals of output target images from the interlace video signals stored in the input buffers;

generating each of the video signals of the output target images when all latest video signals to be components thereof are stored in the input buffers, wherein the latest video signals to be components of each of the video signals of the output target images include the video signal of the odd-numbered field and the video signal of the even-numbered field stored in the input buffers; and changing how to generate the video signals of the output target images according to whether a latest video signal stored in the input buffer is the video signal for the odd-numbered field or the video signal for the even-numbered field, wherein, when generating a video signal of an output target image of an even-numbered field from a video signal of an odd-numbered field stored in the input buffer, an image of the video signal of the odd-numbered field of the input buffer is shifted upward by one line of a field to generate the video signal of the output target image.

14. A method for video signal processing, comprising:

temporarily storing field by field mutually asynchronous interlace video signals outputted from a plurality of imaging devices in input buffers, each interlace video signal comprising a video signal of an odd-numbered field and a video signal of an even-numbered field;

generating field by field video signals of output target images from the interlace video signals stored in the input buffers;

generating each of the video signals of the output target images when all latest video signals to be components thereof are stored in the input buffers, wherein the latest video signals to be components of each of the video signals of the output target images include the video signal of the odd-numbered field and the video signal of the even-numbered field stored in the input buffers; and changing how to generate the video signals of the output target images according to whether a latest video signal stored in the input buffer is the video signal for the odd-numbered field or the video signal for the even-numbered field, wherein, when generating a video signal of an output target image of an odd-numbered field from a video signal of an even-numbered field stored in the input buffer, an image of the video signal of the even-numbered field of the input buffer is shifted downward by one line of a field to generate the video signal of the output target image.

15. A method for video signal processing, comprising:

temporarily storing field by field mutually asynchronous interlace video signals outputted from a plurality of imaging devices in input buffers, each interlace video signal comprising a video signal of an odd-numbered field and a video signal of an even-numbered field;

generating field by field video signals of output target images from the interlace video signals stored in the input buffers;

generating each of the video signals of the output target images when all latest video signals to be components thereof are stored in the input buffers, wherein the latest video signals to be components of each of the video signals of the output target images include the video signal of the odd-numbered field and the video signal of the even-numbered field stored in the input buffers;

determining whether each of the latest video signals stored in the input buffers is the video signal for the odd-numbered field or the video signal for the even-numbered field;

generating the video signal of the output target image for the odd-numbered field, when a number of video signals for the odd-numbered fields is more than a number of video signals for the even-numbered fields among the latest video signals in the input buffers; and generating the video signal of the output target image for the even-numbered field, when the number of video signals for the even-numbered fields is more than the number of video signals for the odd-numbered fields among the latest video signals in the input buffers.

* * * * *